(12) United States Patent
Karas et al.

(10) Patent No.: US 6,922,673 B2
(45) Date of Patent: Jul. 26, 2005

(54) SYSTEMS AND METHODS FOR ORDERING AND DISTRIBUTING INCENTIVE MESSAGES

(75) Inventors: Peter Michael Karas, Lakewood, CO (US); James Everett Cowell, Littleton, CO (US); Michele Denmark, Highlands Ranch, CO (US); Karen Lyon, Highlands Ranch, CO (US)

(73) Assignee: Fist Data Corporation, Greenwood Village, CO (US)

( * ) Notice: Subject to any disclaimer, the term of this patent is extended or adjusted under 35 U.S.C. 154(b) by 301 days.

(21) Appl. No.: 10/187,475

(22) Filed: Jun. 28, 2002

(65) Prior Publication Data

US 2003/0036956 A1 Feb. 20, 2003

Related U.S. Application Data

(63) Continuation-in-part of application No. 09/737,912, filed on Dec. 15, 2000, and a continuation-in-part of application No. 10/010,068, filed on Dec. 6, 2001.

(51) Int. Cl.⁷ .............................................. G06F 17/60
(52) U.S. Cl. ............................. 705/14; 705/26; 705/27; 705/30; 705/33
(58) Field of Search ............................. ; 705/14, 26–27, 705/30, 33, 40, 39, 35; 700/233, 235; 235/381; G06F 17/60, 17/00

(56) References Cited

U.S. PATENT DOCUMENTS

| | | |
|---|---|---|
| 3,599,151 A | 8/1971 | Harr |
| 3,783,755 A * | 1/1974 | Lagin ........................... 355/40 |
| 3,833,395 A | 9/1974 | Gosnell |
| 4,722,554 A | 2/1988 | Pettit |
| 5,119,293 A | 6/1992 | Hammond |
| 5,175,682 A | 12/1992 | Higashiyama et al. |
| 5,220,501 A | 6/1993 | Lawlor et al. |

(Continued)

FOREIGN PATENT DOCUMENTS

| | | | | |
|---|---|---|---|---|
| EP | 0481135 A1 | | 4/1992 | |
| EP | 000481135 A1 | * | 4/1992 | ........... G06F/15/30 |
| EP | 0949596 A2 | | 10/1999 | |
| EP | 1077436 A2 | | 2/2001 | |
| NL | 9401298 | * | 3/1995 | ........... B42D/15/02 |
| WO | WO9525320 A1 | * | 9/1995 | ........... G06F/19/00 |
| WO | WO 00/46725 A1 | | 8/2000 | |
| WO | WO 00/67177 A2 | | 11/2000 | |
| WO | WO 007070517 | * | 11/2000 | ........... G06F/17/60 |
| WO | WO 01/04816 A1 | | 1/2001 | |
| WO | WO 02/05195 A1 | | 1/2002 | |

OTHER PUBLICATIONS

Susan Orenstein, Roses are red, violets are blue, Hallmarks Online, but what can it do?, from http://www.findarticles.com, Nov. 27, 2000.*

Mike Troy, E–greetings break the mold, redefine the industry, from http://www.findarticles.com, Dec. 13, 1999.*

From http://www.findarticles.com/, Blockbuster.com launces giftcard and custom greeting card service; GiftCard/Gift Certificate industry up more than 60% in 2 years, Dec. 13, 1999.*

(Continued)

Primary Examiner—Cuong Nguyen
(74) Attorney, Agent, or Firm—Townsend and Townsend and Crew LLP

(57) ABSTRACT

Systems and methods associated with ordering, producing and/or distributing incentive messages. Systems can include means for receiving requests for incentive messages, for receiving payment for the incentive messages, and for transferring the incentive message to a receiver. Such incentive messages can include a trophy and a negotiable instrument. The trophy can be detachable from the negotiable instrument. Methods can include providing one or more incentive messages.

10 Claims, 21 Drawing Sheets

U.S. PATENT DOCUMENTS

| | | | |
|---|---|---|---|
| 5,426,594 | A | 6/1995 | Wright et al. |
| 5,484,988 | A | 1/1996 | Hills et al. |
| 5,491,325 | A | 2/1996 | Huang et al. |
| 5,504,677 | A | 4/1996 | Pollin |
| 5,513,117 | A * | 4/1996 | Small ................. 700/233 |
| 5,555,496 | A | 9/1996 | Tackbary et al. |
| 5,622,388 | A | 4/1997 | Alcordo |
| 5,677,955 | A | 10/1997 | Doggett et al. |
| 5,679,940 | A | 10/1997 | Templeton et al. |
| 5,699,528 | A | 12/1997 | Hogan |
| 5,757,917 | A | 5/1998 | Rose et al. |
| 5,794,207 | A | 8/1998 | Walker et al. |
| 5,815,657 | A | 9/1998 | Williams et al. |
| 5,826,241 | A | 10/1998 | Stein et al. |
| 5,832,463 | A | 11/1998 | Funk |
| 5,893,080 | A * | 4/1999 | McGurl et al. ........... 705/40 |
| 5,949,044 | A | 9/1999 | Walker et al. |
| 5,960,412 | A * | 9/1999 | Tackbary et al. ......... 705/27 |
| 6,011,833 | A * | 1/2000 | West .................. 379/88.25 |
| 6,029,150 | A | 2/2000 | Kravitz |
| 6,030,000 | A | 2/2000 | Diamond |
| 6,032,133 | A | 2/2000 | Hilt et al. |
| 6,039,245 | A | 3/2000 | Symonds et al. |
| 6,058,417 | A | 5/2000 | Hess et al. |
| 6,064,990 | A | 5/2000 | Goldsmith |
| 6,070,798 | A | 6/2000 | Nethery |
| 6,097,834 | A | 8/2000 | Krouse et al. |
| 6,106,020 | A | 8/2000 | Leef et al. |
| 6,119,106 | A | 9/2000 | Mersky et al. |
| 6,122,625 | A | 9/2000 | Rosen |
| 6,164,528 | A | 12/2000 | Hills et al. |
| 6,175,823 | B1 | 1/2001 | Van Dusen |
| 6,246,996 | B1 | 6/2001 | Stein et al. |
| 6,327,575 | B1 | 12/2001 | Katz |
| 6,360,254 | B1 | 3/2002 | Linden et al. |
| 6,367,693 | B1 | 4/2002 | Novogrod |
| 6,453,300 | B2 * | 9/2002 | Simpson ................. 705/26 |
| 6,510,453 | B1 * | 1/2003 | Apfel et al. ............ 709/206 |
| 6,539,363 | B1 | 3/2003 | Allgeier et al. |
| 2001/0051876 | A1 | 12/2001 | Seigel et al. |

OTHER PUBLICATIONS

Dialog Classic Web, File 15, access No. 01771240, "The echeck market trial: An update" by Susan M. Landry, TMA Journal, v19n1, pp. 22–25, Jan./Feb. 1999.*

Lee et al., Generation of self–authenticating negotiable document e.g. checks, involves providing authenticating data value by computing one–way hash value from data to be included in document & its digital signature, Derwent-Acc-No.: 2001-15832 Jan. 9, 2001.*

Internet Archive Wayback Machine for the operation histories of hallmark.com and bidpay.com, Http://www.bidpay.com, and http://www.hallmark.com.*

From http://www.findarticles.com/, American Greetings adds BlueMountain to online greeting cards empire, Oct. 1, 2001, by Doug Desjardins.*

From http://www.findarticles.com/, Blockbuster selling gift items over web, Jan. 3, 2000.*

Business Wire, "*E–Commerce, Email and E–greeting Cards Combine in New Web Site Designed by Interactive Bureau*", Sep. 14, 1999, (abstract), [online] [retrieved on May 1, 2002], retrieved from PROQUEST Database, 2 pages.

PR Newswire, "*GiftSpot.com Simplifies Gift–Giving on the Internet,*" Oct. 20, 1999, (abstract), [online] [retrieved on May 1, 2002], retrieved from PROQUEST Database, 5 pages.

x.com, *Do More with Your Money*, downloaded from website http://www.x.com., Feb. 7, 2000, 5 pages.

DOTBANK, *The Way to Send and Receive Money on the Internet*, downloaded from website http://www.dotbank.com, Feb. 7, 2000, 6 pages.

Idealab Company, PayMe.com, downloaded from website http://ssl.idealab.com on Feb. 16, 2000, 7 pages.

Confinity, Inc., *Paypal.com, How PayPal.com Works*, downloaded from website http://www.paypal.com on Feb. 7, 2000, 7 pages.

http://www.vfi–finance.com/tranz330.htm, Tranz 330 Fast, Low–Cost Transaction Automation At The Point of Service, VeriFone Finance, Jan. 1999, pp. 1–3, especially pp. 1–2.

* cited by examiner

Fig. 3B

Giftgram: Internet

« | All Images | »
72　　76　　74

FIRST NAME: John

LAST NAME: Sample

CITY: Anytown

STATE / ZIP CODE: NY ▼ 12346

TO: John — 78

MESSAGE: Choose a written message or type your own below ▼ — 80

ENTER YOUR MESSAGE HERE: — 82

Enjoy the money....go get youself something useful!

Gift Check

Pay to the Order of: John Sample — 86　　$10.00 ▼ — 88

Pay Exactly _____

_Authorized Representative_

84

Preview Giftgram — 90

| ADD A CARD | You may use a Mastercard®, Visa® or American Express® card from any U.S. financial institution. Debit cards must bear a MasterCard or Visa logo to be used on the Moneyzap service. |

MY HOME
MONEYZAP FUNDS
SEND MONEY
REQUEST MONEY
TRANSFER MONEY
VIEW TRANSACTIONS
VIEW REQUESTS
ADDRESS BOOK
USER PROFILE
LOG OFF

CREDIT/DEBIT CARD INFORMATION — 152

Name your account [                    ]
(e.g., "Maria's Visa")

Card type     [<Select one> ▼] — 154

Account number [                    ] — 156

Security number [          ] — 158
(The last three or four digits that appear on the back of your Visa or MasterCard card *after* your account number or the four digits above your acount number on the front of your American Express card. Click here for details.) — 160

Expiration date  [January ▼] [2000 ▼]

NAME AS IT APPEARS ON CARD: — 162, 164

First name, MI  [                    ] [  ]

Last name       [                    ]

BILLING ADDRESS AS IT APPEARS ON STATEMENT: — 166

○ Use primary address — 168
   123 Main Street
   Anytown, NY 12345  — 170

○ Enter new billing address — 174, 176
   Street address [                    ]
                  [                    ]
   172

City          [                    ]
   State         [<Select one> ▼] — 180, 178
   Zip code      [                    ]
   Phone number  [                    ] — 182
   184

After you enter this information once, it will be stored in your Wallet for future use. The Western Union MoneyZap serice uses encryption to maintain the confidentialiality and security of your financial data. For more details, read our FAQs.   186 — [ CANCEL ]  [ SUBMIT ] — 188

ADD A CHECKING ACCOUNT

You may use a checking account from any U.S. based financial institution and you must have a valid U.S. driver's license or state-issued ID. (Note: savings accounts cannot be accepted due to the policy of many financial institutions.)

MY HOME
MONEYZAP FUNDS
SEND MONEY
REQUEST MONEY
TRANSFER MONEY
VIEW TRANSACTIONS
VIEW REQUESTS
ADDRESS BOOK
USER PROFILE
LOG OFF

You need to enter ①the check number and ②your account information from the same check. Please refer to an actual check, *which you may still use.*

You will *not* need to provide a new check number for each transaction.

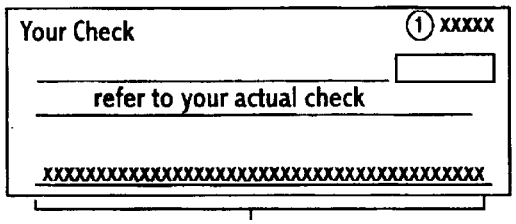

② Account information

| Check number | ① | | 192 |
| Account information | ② | | 194 |
| Re-enter account information | ② | | 196 |

Account information must include ALL of the numbers at the bottom of your check including the bank routing number, your account number and the check number. Please enter the information in the order it appears at the bottom of your check. DO NOT enter special symbols or spaces.

Name your account
(e.g., "City Bank checking") ———198

Driver"s license or state ID number ———200

State issued in  <Select one> ▼ ——202

After you enter this information once, it will be stored in your Wallet for future use. The Western Union MoneyZap service used encryption to maintain the security of your financial data. For more details, read our FAQs.

AUTHORIZATION. I authorize Western Union to debit or credit my checking account in accordance with my instructions, as further detailed in the Terms of Service.

204 — CANCEL   SUBMIT — 206

SYSTEMS AND METHODS FOR ORDERING AND DISTRIBUTING INCENTIVE MESSAGES

CROSS REFERENCE RELATED APPLICATIONS

The present application is a continuation in part of U.S. patent application Ser. No. 09/737,912, entitled "Online Method and System for Ordering and Having Delivered a Paper Greeting Message and Payment Instrument", and filed on Dec. 15, 2000; and U.S. patent application Ser. No. 10/010,068, entitled "Electronic Gift Greeting", and filed on Dec. 6, 2001. The entirety of both of the preceding applications are incorporated herein by reference for all purposes.

FIELD OF THE PRESENT INVENTION

The present invention relates broadly to the transmission of customized messages and, more particularly, to the creation and delivery of a customized paper greeting message having a negotiable payment instrument included therewith or attached thereto.

BACKGROUND OF THE INVENTION

For many years, people have exchanged greeting messages with one another to celebrate holidays and special occasions. It has also been commonplace for an individual to include money or a check inside one of these cards when the holiday or special occasion, such as a Birthday, Christmas, Bar Mitzvah, or Graduation, calls for the giving of a gift.

With the advent of the Internet, it is now possible for a sender to order a paper greeting message online, provide information about herself and the recipient of the greeting message, and have the paper greeting message sent to the recipient directly from the online card seller. It is now also possible to request that a gift certificate be enclosed within such a greeting message ordered online. Such a combination of mass-produced paper greeting messages and an enclosed gift certificate is currently offered jointly by Hallmark.com and GiftCert.com. Other web sites, such as Blockbuster.com, enable the sender to customize the greeting message before inclusion of the gift certificate or gift card redeemable at the particular retail establishment. Unfortunately, with either of these systems, there is no means for attaching or transmitting therewith an actual negotiable payment instrument, such as a check or money order, which is cashable by the payee by depositing the same into the banking system, which processes the instrument through normal bank clearing channels.

Other web sites, such as BidPay.com, enable purchasers of an item from an auction web site to request a money order that can be mailed directly to the seller of the auctioned item to expedite the transfer of the auctioned item from the seller to the purchaser. Once a successful bid has been made for an item at an auction web site, the purchaser can choose to pay for the item by clicking on a BidPay.com logo, which links the purchaser to the BidPay.com web site. After the purchaser enters all of the necessary contact and billing information and after payment authorization has been received, a money order is printed out and mailed to the seller of the auctioned item. The money order is generally printed on an 8.5"×11" sheet of pre-printed paper and is divided into two portions. Typically, one portion is the actual negotiable money order and the other portion is the accounting stub that contains the relevant information about the item being purchased as well as the contact information for the seller and the purchaser. Such money orders can be printed using known automated printing processes. However, as the BidPay.com web site explains, money orders are only available for auction related purchases. Additionally, the BidPay.com web site does not provide for nor is there a suggestion or reason for the purchaser to include a personalized greeting message and selected graphic image to the seller on the "accounting stub" portion of the money order.

As will be apparent from the foregoing description of the Hallmark.com, Blockbuster.com, and BidPay.com web sites, there is currently a need for an entity to be able to order a paper greeting message and request that some form of negotiable payment instrument be included therewith or attached thereto. For fraud and security reasons, a negotiable payment instrument is preferable to a generic gift certificate or gift card since the negotiable instrument can be made payable to the recipient of the message, to another payee, to a specific merchant, or to both a payee and a specific merchant. Preferably, such negotiable payment instrument would be removeably attached to the paper greeting message, which would avoid the manual or highly automated processes for inserting the payment instrument into the card. Thus, among other things, the present invention addresses these particular needs.

BRIEF SUMMARY OF THE INVENTION

Briefly described, the present invention includes, in a computerized system, a method of creating a printed greeting message having a negotiable payment instrument included therewith, and comprising the process of enabling a requester of the message to select a graphic image for inclusion in the message to a recipient, enabling the requestor to input customized text for inclusion in the message, enabling the requester to specify a payee and the monetary value of the negotiable payment instrument, and printing the message and negotiable payment instrument. The message can include the graphic image and customized text selected by the requester and the negotiable payment instrument can include the payee and the monetary value selected by the requester. In some cases the payee will be the same as the recipient. In other cases, the payee and recipient may be different individuals or entities. Additionally, in some cases, the negotiable payment instrument will be removeably attached to the message. Further, the message and the negotiable payment instrument may also be printed on the same paper form at the same time.

The method can further include the process of enabling the requestor to select an occasion for sending the message and payment instrument to the recipient and presenting the requester with a proposed graphic image and proposed customized text for inclusion in the message based on the occasion selected by the requester.

In another aspect of the invention, the method can further include the process of displaying a data entry form to the requester over a computer network, in which the form has a plurality of data entry fields for displaying the graphic image, the customized text, the payee, and the monetary value of the negotiable payment instrument. Additionally, in another aspect of the present invention, the data displayed in the plurality of data entry fields is modifiable by the requester.

The method can further include the process of receiving contact information for the recipient of the message, either by enabling the requestor to input the contact information or by enabling the requestor to select the recipient from an address book listing available recipients. Conversely, the method can further include the process of receiving contact information for the requester.

In another aspect of the present invention, the method can include the process of enabling the requester to input billing information to pay for the creation of the message and the negotiable payment instrument. Additionally, payment authorization can be requested using the billing information obtained from the requestor.

Additionally, the method may further include the process of presenting the requester with a preview of the printed message and negotiable payment instrument and enabling the requestor to specify a delivery date for the message and negotiable payment instrument.

Another aspect of the present invention includes a system for enabling a requestor to order and have delivered to a recipient a customized greeting message having a negotiable payment instrument included therewith, the system having means for selecting a graphic image for inclusion in the message, means for specifying customized text for inclusion in the message, means for specifying a payee for the negotiable payment instrument, means for selecting the monetary value of the negotiable payment instrument, means for printing the message and negotiable payment instrument, and means for mailing the message and negotiable payment instrument to the recipient.

The system may further include means for displaying a data entry form to the requester over a computer network, in which the form has a plurality of data entry fields for displaying the graphic, the customized text, and the monetary value of the negotiable payment instrument. In another aspect of the present invention, the information displayed in the plurality of data entry fields is modifiable by the requester.

The system may further include means for selecting the occasion for sending the message and negotiable payment instrument. In such cases, the graphic image and customized text are pre-selected based on the occasion. Further, the graphic image and customized text may be modifiable by the requestor.

In another aspect of the present invention, the system may further include means for displaying a preview of the printed message and the negotiable payment instrument to the requestor and means for enabling the requestor to specify a delivery date for the message and negotiable payment instrument.

As with the above method, in the system of the present invention the recipient and the payee may be the same or different. Further, the negotiable payment instrument may be removeably attached to the message and printed on the same paper form at the same time.

Yet other embodiments of the present invention provide a method for distributing incentive messages. The method includes providing an incentive message that includes a trophy and a negotiable instrument, such that the trophy is detachable from the negotiable instrument. The method further includes receiving a request for the incentive message from a recipient point-of-contact, receiving a payment for the requested incentive message, and transferring the requested incentive message to the recipient point-of-contact. In some instances of the embodiment, the trophy further includes a custom message field for accepting a customized message, and the method further includes receiving the customized message from the recipient point-of-contact, and inserting the customized message in the custom message field. In some instances, the trophy further includes a signature field for accepting a signature, and the method further includes receiving the signature from the recipient point-of-contact, and inserting the signature in the signature field. In some instances, the trophy further includes a logo associated with the recipient point-of-contact.

In various instances of the method, the request for the incentive message from the recipient point-of-contact includes an indication of an amount to be provided with the negotiable instrument. The amount can indicate either a cash amount, or an item. In some instances, the method further includes providing a second incentive message type, and receiving a selection from the recipient point-of-contact that indicates which of the incentive message types is being selected. In other instances, the method additionally includes receiving a name for a recipient of the incentive message, and associating the name with the incentive message. In some instances, the trophy is of a size suitable for framing in an eight inch by ten inch frame, a five inch by seven inch frame, or an eleven inch by fourteen inch frame.

In various instances, the incentive message is a first incentive message type associated with a first occasion. The methods can further includes providing a second incentive message type that is associated with a second occasion, and receiving a selection from the recipient point-of-contact indicating the first occasion. In response, the first incentive message is provided based at least in part on the selection of the first occasion. In other instances, the method additionally includes displaying a data entry form to the recipient point-of-contact over a computer network. Such a form includes one or more data entry fields for selecting a graphic image, a customized text, a signature, and a negotiable instrument. In some cases, a preview of the incentive message can be displayed over a computer network prior to transferring the requested incentive message to the recipient point-of-contact. Further, an approval for the incentive message can be provided based at least in part on the displayed message.

Yet other embodiments of the present invention provide an incentive message that includes a trophy and a negotiable instrument that are detachable from each other. In some instances, such a trophy can include a graphical image with a logo associated with a recipient point-of-contact. In some instances, the trophy further includes a custom message provided by the recipient point-of-contact.

Yet further embodiments of the present invention include a system for providing incentives to a recipient. Such a system can include a means for receiving a request for an incentive message that includes a trophy and a negotiable instrument that are detachable from one another, a means for receiving payment for the requested incentive message, and a means for transferring the requested incentive message to a recipient point-of-contact. Thus, the recipient point-of-contact can distribute the incentive message to a recipient.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sublabel, it is intended to refer to all such multiple similar components.

FIG. 5 is a screen shot illustrating an example data entry page for entering credit card or debit card information for use with the present invention;

FIG. 6 is a screen shot illustrating an example data entry page for entering checking account information for use with the present invention;

DETAILED DESCRIPTION OF THE INVENTION

Figure 1:
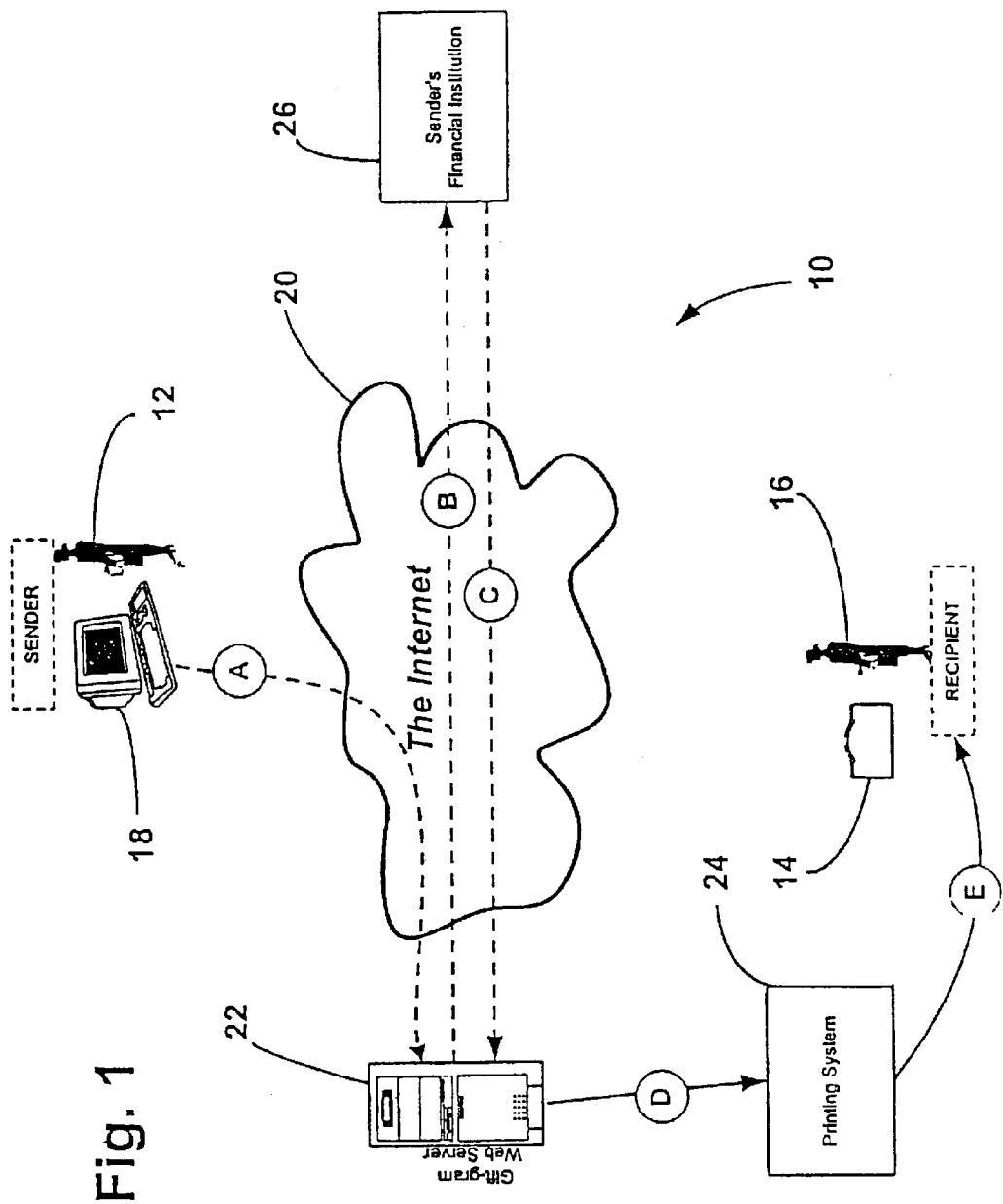
FIG. 1 illustrates an online ordering and delivery system in accordance with an embodiment of the present invention.

The present invention is directed to systems, methods and articles for enabling an individual or entity to order a paper greeting message that can be customized or personalized and having included therewith or attached thereto a negotiable instrument. In some cases herein, the paper greeting message/payment instrument combination is referred to as a "gift-gram", or "incentive message." As used herein, the person ordering the gift-gram will generally be referred to the "sender" or "requester." The person to whom the gift-gram is sent will generally be referred to as the "recipient." In various cases, the recipient of the gift-gram will also be the payee identified on the payment instrument portion of the gift-gram; however, it is within the scope of present invention that the gift-gram could be mailed to a specific recipient and the payment instrument could be made out to a different payee. For example, a grandparent could mail the gift-gram to the ant at the parent's address but have the payment instrument made out to the grandchild. Similarly, the payment instrument could be made out to a department store or retail merchant or it could be made out to a payee and a specific merchant or store, if desired.

For the purposes of this document, an incentive message can be any negotiable instrument that is associated with a textual and/or a graphical message. Thus, for example, an incentive message can be a gift-gram as previously described. Such negotiable instruments can be any instrument having an exchange value. For example, negotiable instruments can include, but are not limited to, checks, money orders, vouchers for plane tickets or other merchandise, checks payable to the order of a third party, gift certificates, coupons redeemable for frequent flyer miles or cellular phone minutes, and the like. Messages associated with the negotiable instruments can include, but are not limited to, special occasion greetings, congratulatory messages, get well messages, a manager's review of a particular employee, or the like. Such messages can be referred to as a "trophy" because they recognize an accomplishment, milestone, or other occasion to which the message and/or negotiable instrument are related. The messages can be textual, graphical, or a combination thereof. Thus, for example, a message can include a logo associated with the recipient point-of-contact. Based on this discussion, one of ordinary skill in the art will recognize a number of other message types and/or negotiable instruments that can be combined to create an incentive message in accordance with the present invention.

Also for purposes of this document, a recipient point-of-contact can be any entity desiring to distribute incentive messages to one or more recipients associated therewith. Thus, a recipient point-of-contact can be an employer with a number of recipient employees. As another example, a recipient point-of-contact can be a company desiring to distribute incentive messages to one or more recipient clients. As will be appreciated, a recipient is any person or entity enjoying some relationship and/or association with a recipient point-of-contact. Thus, for example, a recipient can be an employee, a charitable donor, a client, a customer, or any other associate of the recipient point-of-contact. Based on this discussion, one of ordinary skill in the art will recognize a number of other examples of a recipient point-of-contact and/or recipients that are possible in accordance with the present invention.

As a specific example utilizing one/embodiment of the present invention, systems and methods are provided that allow a requestor, such as a human resources manager for a recipient point-of-contact, to request incentive messages for all recipient employees that have worked for the recipient point-of-contact for five years. The requested incentive messages are authorized, produced and delivered via a central authorization system. The incentive messages can be delivered to a recipient point-of-contact, where they are personalized and distributed to one or more recipients associated with the recipient point-of-contact. Thus, the present invention provides a quick and efficient mechanism for encouraging and/or rewarding employees of the recipient point-of-contact and/or other. The following discussion provides greater detail about the systems and methods associated with the present invention. From such discussion, one of ordinary skill in the art will recognize the myriad of possible applications for the present invention in addition to the previously recited specific example.

FIG. 1 illustrates an on-line network system 10 for enabling a sender 12 to create a gift-gram 14 and have it sent to a recipient 16 in accordance with an embodiment of the present invention. The system 10 is connected for computer communications via the known world wide computer network, known as the Internet, which is shown generally at 20 and depicted as a "cloud" to indicate the amorphous and nebulous manner in which computers communicate using this network The system 10 contemplates the sender 12 having access to a personal computer 18, which would have access to the Internet 20 using any known means, such as phone connection, cable connection, wireless connection, and the like. In addition, the computer 18 would need to have suitable software, such as a "web browser," to enable the computer 18 to access the online web site or other computer-network accessible facility, hosted by web server 22. Web server 22 can be a standard computer, computer server, or combination of computer servers programmed and configured to host an on-line web site accessible over the Internet 20. Although it is contemplated that the gift-gram 14 of the present invention could be ordered by the sender 12 over the Internet 20 using a computer 18 equipped with a suitable web browser and connected to the web server 22 of the gift-gram producer, other methods of communicating with the computer server of the gift gram producer, such as a kiosk, a hand-held device, and the like, are also contemplated within the scope of the present invention.

It is further contemplated that web server 22 would be connected, directly, indirectly, or through known networking means, to printing system 24. Using known printing and processing techniques, the printing system 24 would be capable of printing a high volume of gift-grams with MICR ink using either pre-printed forms or blank forms, folding and inserting each gift-gram into an envelope having a window for the address, and placing proper postage on the outside of each envelope for mailing or other commercial delivery. The system 10 also contemplates inclusion of the sender's financial institution 26, which could be a bank account or credit card account of the sender 12.

FIG. 1 also illustrates a sequence of steps, identified by circled letters, by which the various entities communicate with each other using the present invention. For example, in step A, the sender 12 "orders" a gift-gram 14 online from web server 22. More specifically, sender 12 accesses the web site hosted by the web server 22 over the Internet 20, and the sender 12 and web server 22 communicate back and forth until sufficient information has been exchanged for the gift-gram 14 to be "ordered," a process which will be described in greater detail hereinafter. Once the gift-gram 14 had been ordered online, web server 22 would communicate with sender's financial institution 26 in step B to request authorization of payment for the cost of the gift-gram 14. In step C, sender's financial institution 26 would authorize or refuse the transaction for the cost of the gift-gram. Although communication between web server 22 and financial institution 26 is shown going through the Internet 20, such communication could also occur through other conventional channels, such as a phone line or secure banking network. In an alternate embodiment (not shown), it is possible for sender 12 to have a money account or stored value account directly with the company that operates web server 22, in which case, authorization of payment would not need to go to sender's financial institution 26, but could take place within web server 22 itself or between web server 22 and another server (not shown) operated by the same company.

In step D, after payment had been authorized, web server 22 would communicate with printer system 24 to initiate actual preparation of the gift-gram 14. Web server 22 would transfer all data and information necessary to fill in all of the "fields" of the gift-gram, as will be described hereinafter. The actual printing process used by printing system 24, including the use of MICR printing techniques, folding of the gift-gram 14, inserting of the gift-gram 14 into an envelope, and the placement of sufficient postage for mailing on the envelope are all known to those skilled in the printing art. In step E, the gift-gram 14 is actually mailed to recipient 16 using known mailing techniques.

Figure 2:
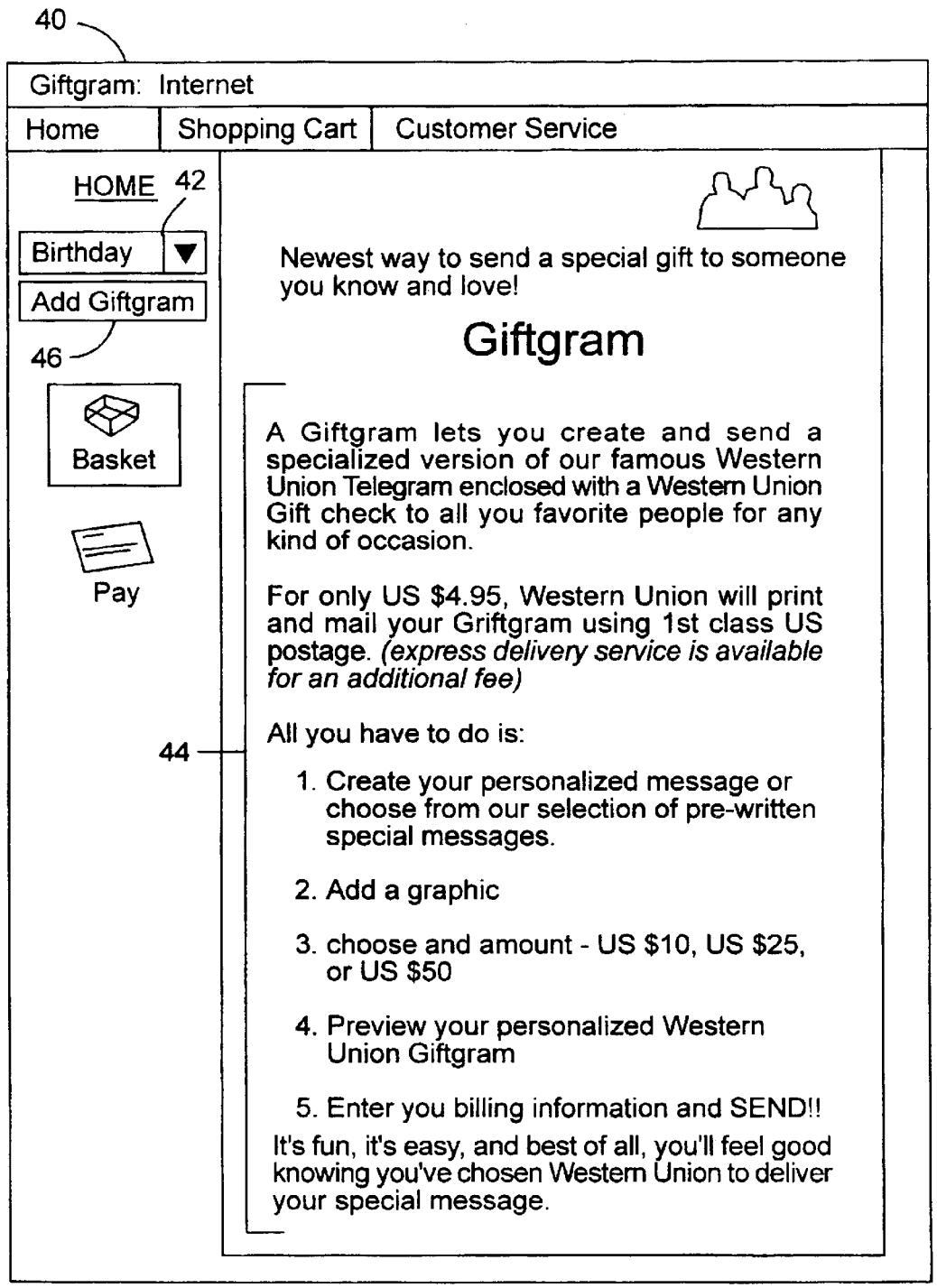
FIG. 2 is a screen shot of an example homepage hosted by a web server for use with the present invention.

Referring now to FIG. 2, a typical Internet homepage 40 that could be hosted by web server 22 and displayed on sender's computer 18 using a suitable web browser is displayed. Although the homepage 40 is shown to be that of Western Union® Gift-gram™, other companies could offer a similar service and product with their own customized web pages and still fall within the scope of the present invention. Additionally, although the functionality of the present invention will now be described with reference to specific web pages (FIGS. 2–6), it should be understood that the various functions ascribed to each web page could be rearranged, repositioned, reformatted, and the like, and still fall within the intended scope of the present invention. For example, pull down menu 42 and button 46 (described in greater detail hereinafter) are shown and described with reference to FIG. 2; however, their function could easily be moved to another web page, such as at the beginning of data entry web page 50 of FIG. 3A or to another web page altogether without affecting the functionality and processes of the present invention. As another example, the functionality of homepage 40 and data entry web page 50 could easily be combined into a single web page using known programming techniques, again, without affecting the functionality and processes of the present invention.

Homepage 40 includes general information 44 about the gift-gram web site. In addition, using pull down menu 42, sender 12 can select the "occasion" for the gift-gram, which will determine what pre-selected graphics and greetings will be offered to the sender on the data entry page 50 (see FIGS. 3A and 3B) and which will appear on the gift-gram 14. By way of example, "birthday" has been-selected in pull down menu 42. Other options for the "occasion" for sending the gift-gram 14 are as limitless as the human imagination, but could include such things as Christmas, Easter, Graduation, Wedding, Anniversary, Valentine's Day, Mother's Day, Secretary's Day, and the like. Once the occasion has been selected, sender 12 can select button 46 to proceed to the data entry web page 50.

Figure 3A:
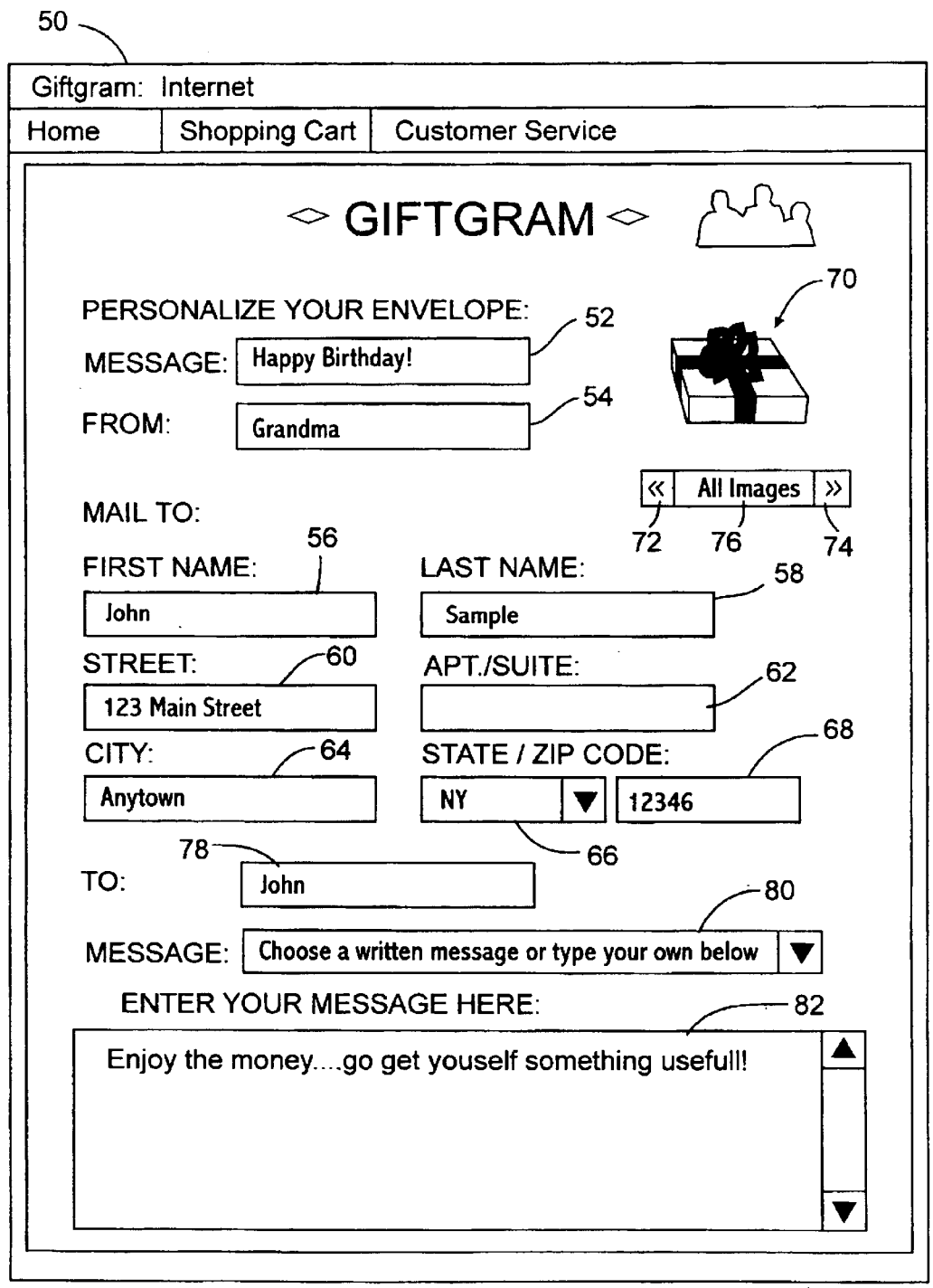
FIG. 3, consisting of FIGS. 3A and 3B, is a screen shot illustrating an example data entry web page hosted by the web server of FIG. 2.
Figure 4A:
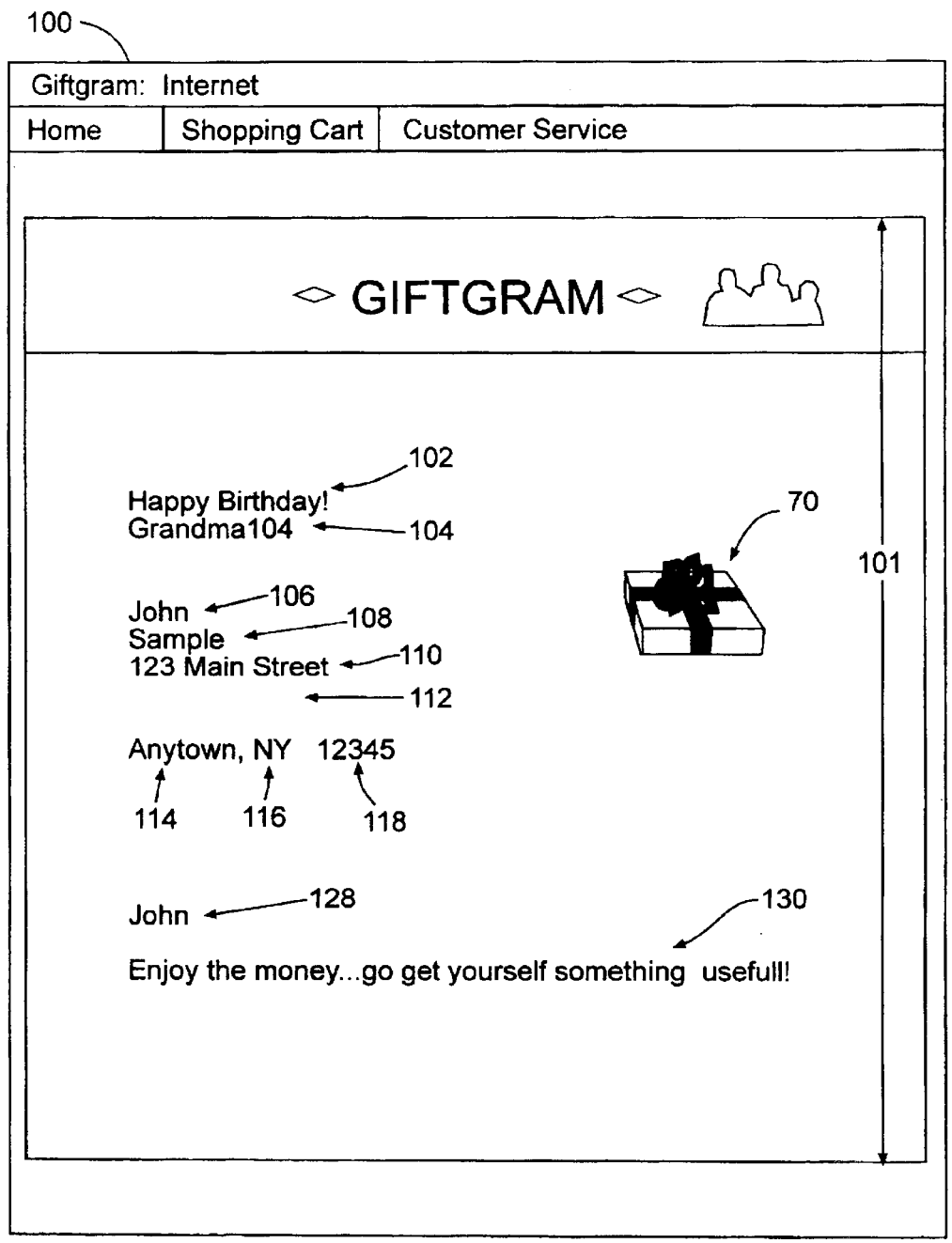
FIG. 4, consisting of FIGS. 4A and 4B, is a screen shot illustrating an example preview web page showing an example gift-gram of the present invention.

The data entry web page 50 is illustrated in FIGS. 3A and 3B. The message field 52 is pre-populated based on the selected "occasion" chosen in pull down menu 42; however, sender 12 has the option and capability of adding, modifying, or deleting the pre-selected message by moving the cursor into the field and typing a new message in known manner. The sender 12 next proceeds to the "from" field 54 to input her "informal" title based on her relationship, if any, with the recipient 16. Optionally, if this field is left blank, then the sender's actual name, obtained from the billing information data entry web pages (described hereinafter) or from the web server database, can be used as the default name in field 104, as shown in FIG. 4A. Next the sender enters the name 56,58, street address 60,62, city 64, state 66, and zip code 68 of the recipient 16. Although not shown, it would be easy to include on the data entry web page 50 a link to an address book maintained by the web server 22 having a list of recipients previously entered by the sender 12 and from which fields 56–68 could be automatically filled by merely selecting the name of the intended recipient 16 from the address book. Like message field 52, graphic 70 is pre-selected based on the selection chosen in pull down menu 42. Note, however, that the sender 12 has the option of scrolling backward 72, scrolling forward 74, or viewing all available images 76 in the web server database by selecting the appropriate button on the screen in known manner. If the sender 12 scrolls forward or backward, a new graphic image will appear in place of graphic 70. If the sender 12 decides to view all available images 76, such images would either be displayed in a new "window" on the computer screen or displayed in a designated area on the data entry web page 50. If the sender selects a new image from the displayed images, again, that new image will appear in place of the graphic 70. Field 78 is automatically filled in using the information entered into field 56; however, if desired, sender 12 can input a different name if she wants the payment instrument made payable to a payees) different from the recipient of the gift-gram specified in fields 56 and 58. In pull down menu 80, the sender 12 can select from a number of pre-written messages, which will then appear in window 82. The list of available pre-written messages is pre-populated based on the occasion selected by the sender 12. If desired, the sender 12 can add, modify, or delete the pre-written message in window 82. The sender 12 can also create her own personalized message by typing the message directly into window 82 in known manner. A graphic version of the payment instrument 84 appears at the bottom of the data entry screen 50. Field 86 is automatically filled in based on the information entered for fields 56, 58, and 78. If field 78 is the same as field 56 or 56 in combination with field 58, field 86 will be filled in with the information from fields 56 and 58; however, if field 78 is different from field 56 or field 56 in combination with 58, field 86 will be filled in with the data input into field 78. Using pull down menu 88, the sender 12 can select how much money she wants to send to recipient 16 as a gift. Generally, sender will be offered several limited choices for amount of the payment instrument, such as $10, $20, $50, and other. If "other" is selected, the sender 12 can input a custom amount of money; however, web server 22 will generally cap the amount at a certain level for fraud and security reasons. Unless the sender 12 decides to change any of the fields in the data entry page 50, which can be done while viewing the page 50, the sender 12 will next be able to preview on her computer 18 how the gift-gram 14 will appear when printed by selecting button 90 in known manner.

Figure 4B:
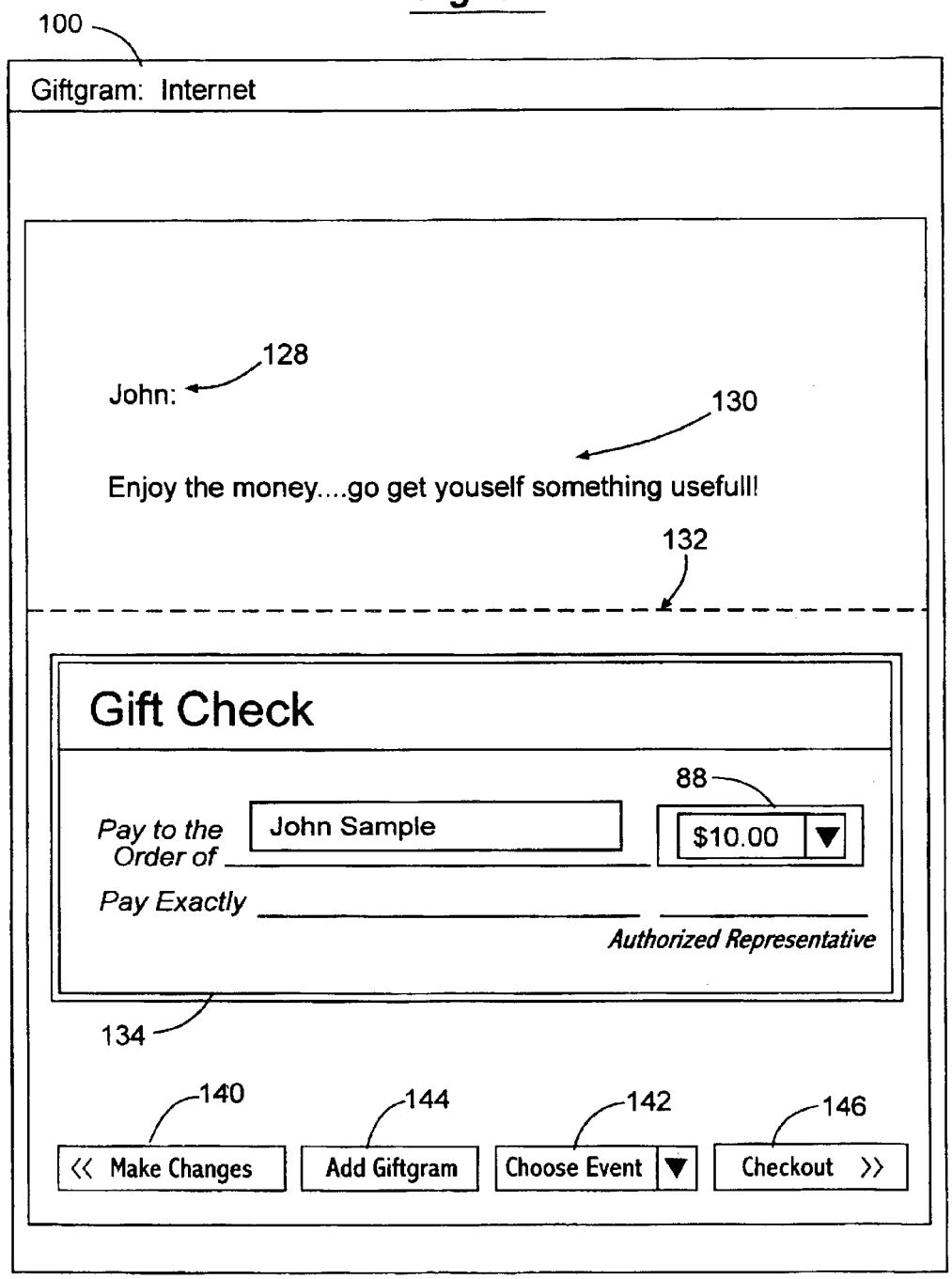

FIGS. 4A and 4B illustrate an example gift-gram print preview screen shot 100. The screen shot roughly approximates the proportions the gift-gram 14 will have once printed. In the preferred embodiment, the upper two thirds of the preview screen contain the greeting portion 101 and the lower one third contains the payment instrument 134. The actual proportions between the greeting portion 101 and the payment instrument 134 of the actual gift-gram 14 can vary within the scope of the present invention. Preferably, the gift-gram 14 is printed as a single sheet with the payment instrument portion detachable from the greeting portion for ease in cashing the same. The two portions are separated by a simulated perforation 132, which corresponds with the perforation that occurs on the preferred version of the actual gift-gram 14. The greeting portion 101 contains the message that was entered into field 52. The informal title 104 is the one that the sender 12 entered into field 54. The recipient's name 106, 108 corresponds to that entered into fields 56, 58, respectively. The recipient's address 110, 112 corresponds to that entered into fields 60, 62, respectively. And the recipient's city 114, state 116, and zip code 118 correspond to that entered into fields 64, 66, and 68, respectively. Graphic 120 correspond to whichever graphic 70 was finally selected by the sender 12 as described previously. The "to" line 128 corresponds with the name entered into field 78, and the message 130 corresponds with the message entered into field 82. The graphic version of the payment instrument 134 shows the payee 136, which corresponds with the payee shown in field 86. The amount 138 of the payment instrument corresponds with the amount selected in pull down menu 88.

After previewing the graphic version of the payment instrument, the sender 12 has the option of going back and making changes to any of the data entry fields by selecting button 140, which returns the sender 12 to the data entry web page 50. If the sender 12 wants to create an additional gift-gram to send to someone else, the sender 12 can select a new "occasion" from pull down menu 142 and then go to a new data entry web page 50 by selecting button 144. Alternatively, if the sender 12 does not want to create any additional gift-grams, the sender can select button 146 to complete the processing of the order.

The sender 12 would then go to a check out web page (not shown). At the check out page, the sender 12 would first be given the opportunity to select delivery method, such as First Class Mail, Priority Mail, or Express Mail, for sending the gift-gram 14 to the recipient 16. Once this option had been chosen, the cost for sending the gift-gram would be presented to the sender 12. If the sender 12 had previously registered with the web server 22, the sender would be given the opportunity of paying for the gift-gram 14 using a predefined credit card, debit card, or checking account. If the sender 12 had not previously registered or desired to register a new payment method, the sender would be directed to an account setup screen such as those shown in FIGS. 5 and 6.

FIG. 5 illustrates an example of a credit card/debit card entry web page 150. Such a web page is conventional and would contain data entry fields, such as account name 152, card type 154, account number 156, security number 158, expiration month and year 160, first name 162, middle initial 164, and last name 166, as they appear on the card. The sender 12 would also specify a primary address 168, which would be pre-filled using sender's home address 170 if known, or a new billing address 172, if different from 170. Address fields 174, 176, 178, 180, 182, and 184 are self-explanatory. At the end of the data entry web page, the sender 12 could select the cancel button 186 to delete the field entries and return to the previous web page or select the submit button 188 to have the account set up and processed.

FIG. 6 merely illustrates an example of a checking account setup web page 190, which is also conventional. This web page would include data entry fields, such as check number 192, account information 194, a confirmation of account information 196, a name of the account 198, a driver's license or state ID number 200, and the state 202 in which such ID was issued. At the end of this data entry web page 190, the sender 12 could select the cancel button 204 to delete the field entries and return to the previous web page or select the submit button 206 to have the account set up and processed.

Once billing information was entered and selected by the sender 12, the web server 22 would request and wait for fund authorization from the sender's financial institution 26 before initiating a print command to printing system 24, as described previously. Although not shown, on the check out page, the sender 12 could enter a desired date in the future for mailing of the gift-gram 14. Such date could be set and web server 22 would delay sending the printing command to the printer system 24 until such a date, provided fund authorization had been received prior to the requested mailing date.

Figure 7:
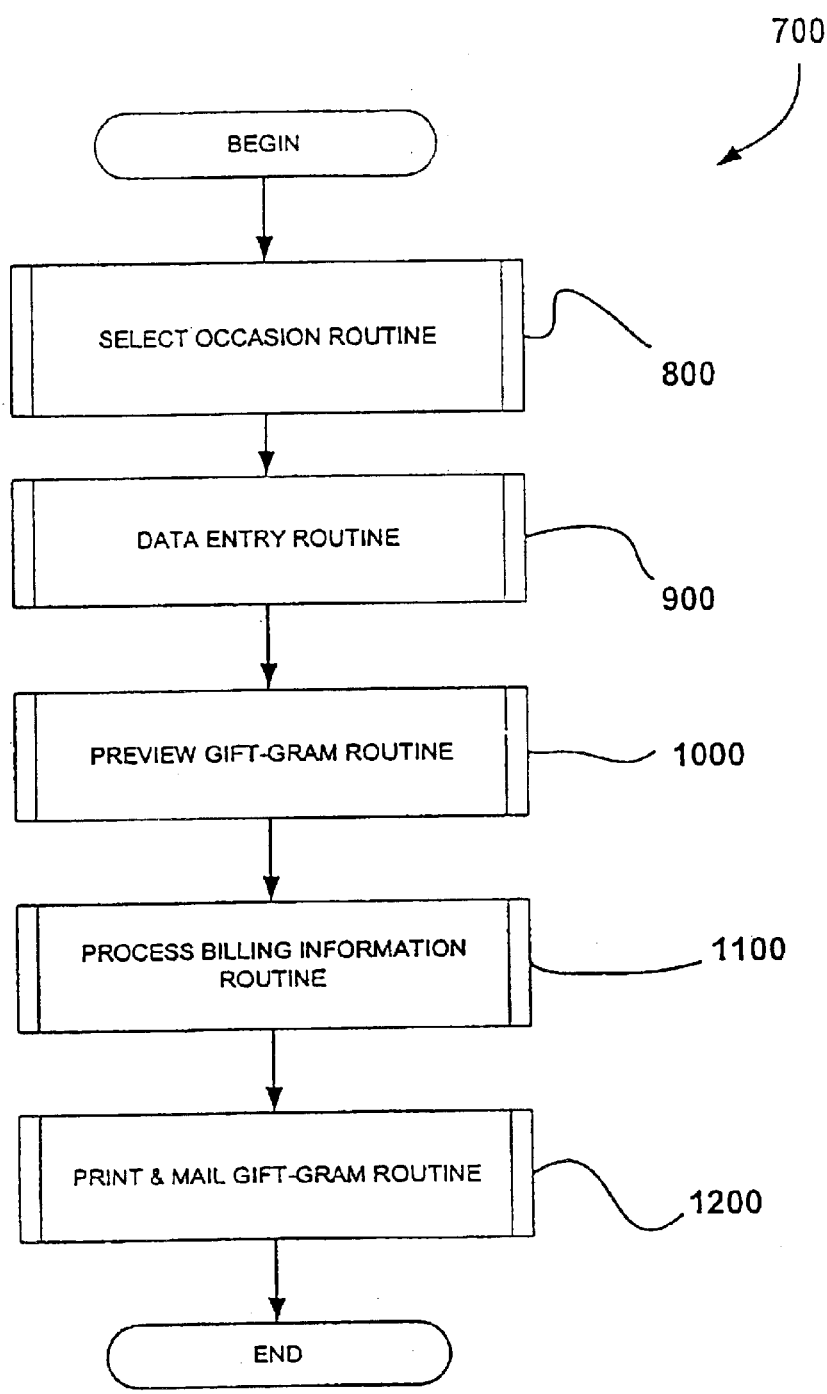
FIG. 7 is a flow diagram illustrating the main system routines of the online ordering and delivery system in accordance with an embodiment of the present invention.

Turning now to FIGS. 7–12, the methods and processes of the present invention as previously described are shown in flow chart format. More specifically, FIG. 7 illustrates the main process system 700, which comprises the main sequence of routines taken by on-line network system 10. Once sender 12 accesses the web server 22, a select occasion routine 800 is initiated. Once the select occasion routine 800 is completed, the data entry routine 900 is initiated. This same process repeats through the preview gift-gram routine 1000, the process billing information routine 1100, and the print and mail routine 1200.

Figure 8:
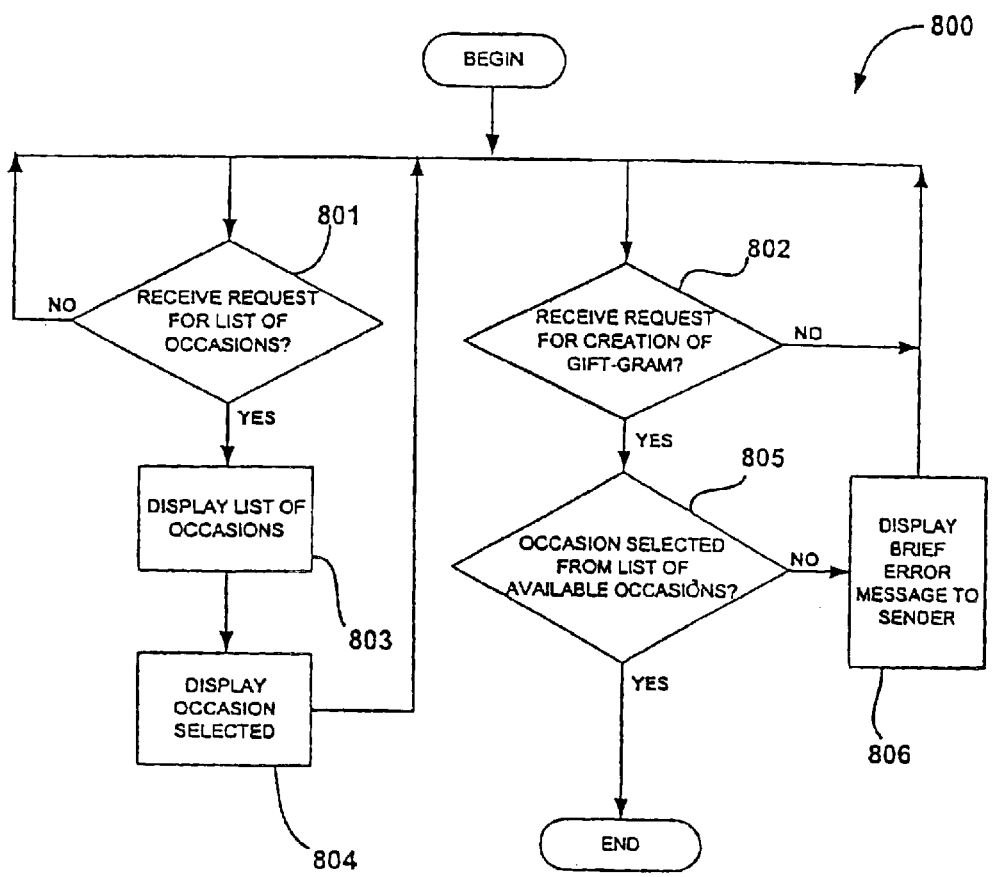
FIG. 8 is a flow diagram illustrating the select occasion routine of FIG. 7 in accordance with an embodiment of the present invention.

Referring now to FIG. 8, the select occasion routine 800 will be discussed in greater detail. Beginning at steps 801 and 802, the system runs an endless loop waiting for the sender either to request a list of the occasions for sending the gift-gram in step 801 or to request creation of a gift-gram in step 802. For reasons that will become apparent, the sender is first required to request the list of occasions available in step 801. Once this is done, the system proceeds to step 803 and displays the list of available occasions for which gift-grams can be created using the system. The displayed list may be in a pull-down menu format, such as that shown by menu 42 in FIG. 2. Once the sender selects one of the occasions from the list of available occasions, the system proceeds to step 804 and displays the selected "occasion" in the main window of the pull down menu 42. The system then returns to the endless loop, again, waiting for the sender either to request a list of the occasions for sending the gift-gram in step 801 or to request creation of a gift-gram in step 802. If the sender requests to create a gift-gram in step 802, in step 805 the system verifies that the sender has actually selected an occasion from the list of occasions available. If none has been selected, the system displays a brief message to the sender in step 806 requesting that she select an occasion. If an occasion has been selected, the system proceeds to the data entry routine 900.

Figure 9:
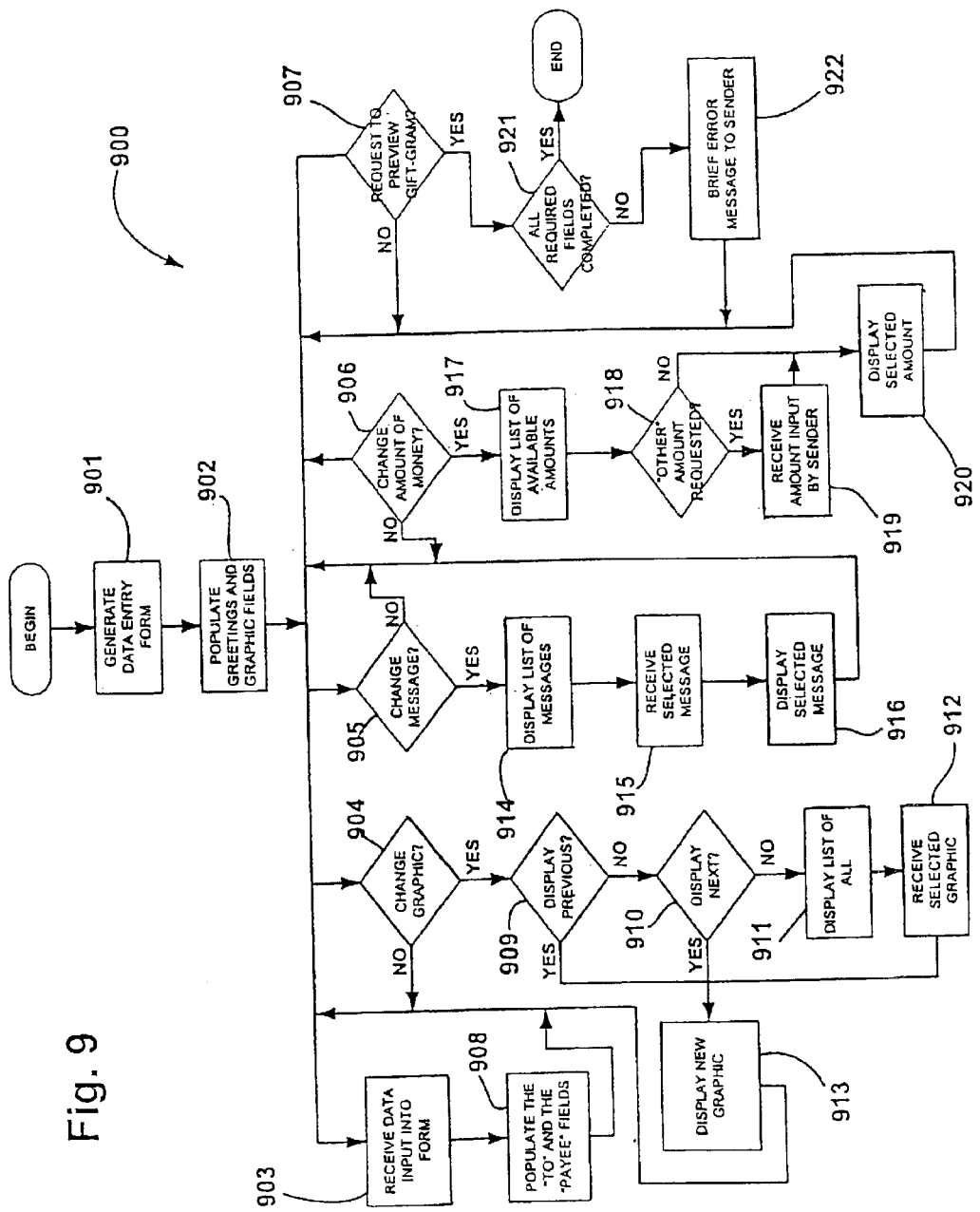
FIG. 9 is a flow diagram illustrating the data entry routine of FIG. 7 in accordance with an embodiment of the present invention.

Referring now to FIG. 9, the data entry routine 900 is illustrated. Beginning at step 901, the system generates a data entry form web page. Next, in step 902, the system pre-populates the greeting fields and displays a graphic in the graphics field based on the occasion selected by the sender as discussed previously. Next, in steps 903 through 907, the system runs an endless loop waiting for the sender to complete the data entry form and then to request a preview of the gift-gram. As will be explained, the sender cannot proceed to the preview gift-gram routine 1000 until all required information has been input into the data fields. In step 903, the sender inputs data into the data entry fields in the form. In step 908, the system automatically populates the "to" and "payee" data field using information provided by the sender in other data fields. The sender can override the automated entries in step 908 by typing new information directly into the appropriate field during step 903.

In step 904, the sender has the option of changing the graphic previously selected in step 902. In steps 909 and 910, respectively, the sender can request that the "previous" or "next" graphic in the list of available graphics be displayed. Alternatively, in step 911, the sender can request that all available graphics be displayed for selection purposes. In step 912, the sender selects one of the available graphics. In step 913, the selected graphic is displayed in the data entry form in place of the originally pre-selected graphic.

In step 905, the sender has the option of changing the message displayed, for example, in field 82 and previously selected in step 902. In step 914, the list of available pre-written messages is displayed. In step 915, the sender selects one of the pre-written messages. In step 916, the selected message is displayed in the data entry form in place of the originally pre-selected message. Obviously, the sender has the option of adding, modifying, or deleting the message in field 82 by inputting the appropriate text in step 903.

In step 906, the sender has the option of changing the amount of the payment instrument that will be part of the gift-gram. The amount of the payment instrument can be set by default at a minimum level, such as $10.00, and pre-populated in step 902. Alternatively, the amount can be initially left blank, which would require the sender to affirmatively select an amount. In step 917, the list of available amounts of money that can be included on the payment instrument is presented, for example, in a pull down menu format. If the sender selects the "other" option rather than one of the specific amounts presented, the sender is required to input the amount in step 919. The selected amount or the input amount of the payment instrument is then displayed in the relevant data entry field in step 920.

In step 907, the sender has the option of requesting a preview of the gift-gram. In step 921, if all required fields have been completed by the sender or the system, then the system will initiate the preview gift-gram routine 1000. If all of the required data entry fields have not been completed, the sender is presented in step 922 with a brief message explaining that additional information must be entered and the sender returns to the endless loop in which the sender must input data into the data entry fields.

Figure 10:
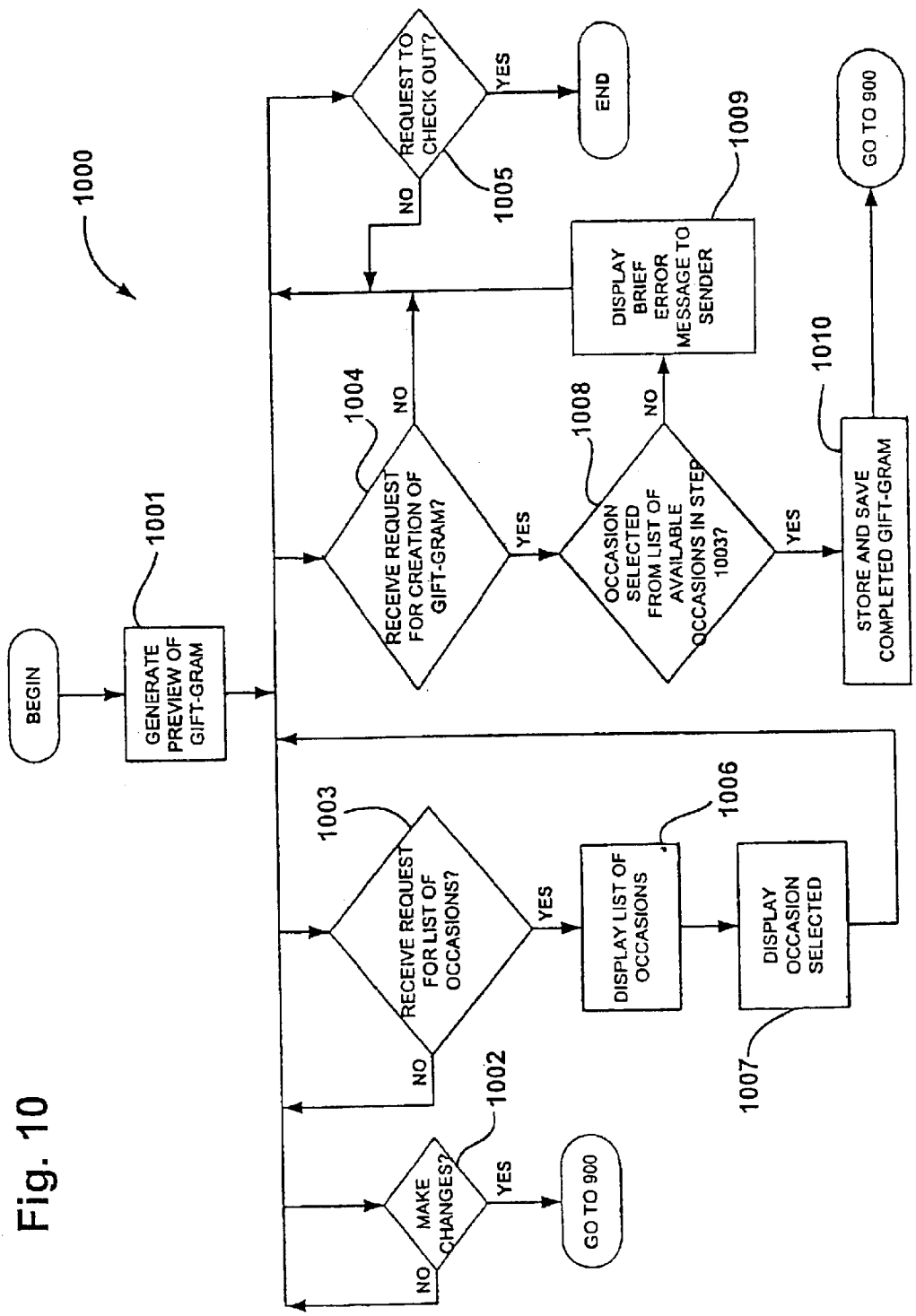
FIG. 10 is a flow diagram illustrating the preview gift-gram routine of FIG. 7 in accordance with an embodiment of the present invention.

Referring now to FIG. 10, the preview gift-gram routine 1000 is illustrated and will be discussed in greater detail. In step 1001, the system generates a web page preview of approximately what the gift-gram will look like when printed. In steps 1002 through 1005, the system runs an endless loop waiting for the sender to request the opportunity to make changes to the existing gift-gram, to save the existing gift-gram and create a new one, or to request the opportunity to "check out" and send the gift-gram. More specifically, in step 1002, the sender may request the opportunity to make-changes to the previously created gift-gram. This allows the sender to make any necessary corrections or modification that she notes while previewing the gift-gram. If the sender wants to make changes, she is sent back to the data entry routine 900.

With steps 1003 and 1004, the sender has the option of saving the current gift-gram and creating a new one. Once again, to create a new gift-gram, the sender is first required to request the list of occasions available in step 1003. Once this is done, the system proceeds to step 1006 and displays the list of available occasions for which gift-grams can be created using the system. The displayed list may be in a pull-down menu format, such as that shown by menu 142 in FIG. 4B. Once the sender selects one of the occasions from the list of available occasions, the system proceeds to step 1007 and displays the selected "occasion" in the main window of the pull down menu 142. The system then returns to the endless loop. If the sender requests to create a new gift-gram in step 1004, in step 1008 the system verifies that the sender has actually selected an occasion from the list of occasions available in step 1003. If none has been selected in step 1003, the system displays a brief message to the sender in step 1009 requesting that she select an occasion. If an occasion has been selected, the system stores and saves the existing gift-gram data and information in step 1010, then the system initiates a new data entry routine 900 for the new gift-gram.

In step 1005, after previewing the gift-gram, the sender has the option of checking out. If the sender requests the check out procedure, the system proceeds to the process billing information routine 1100.

Figure 11:
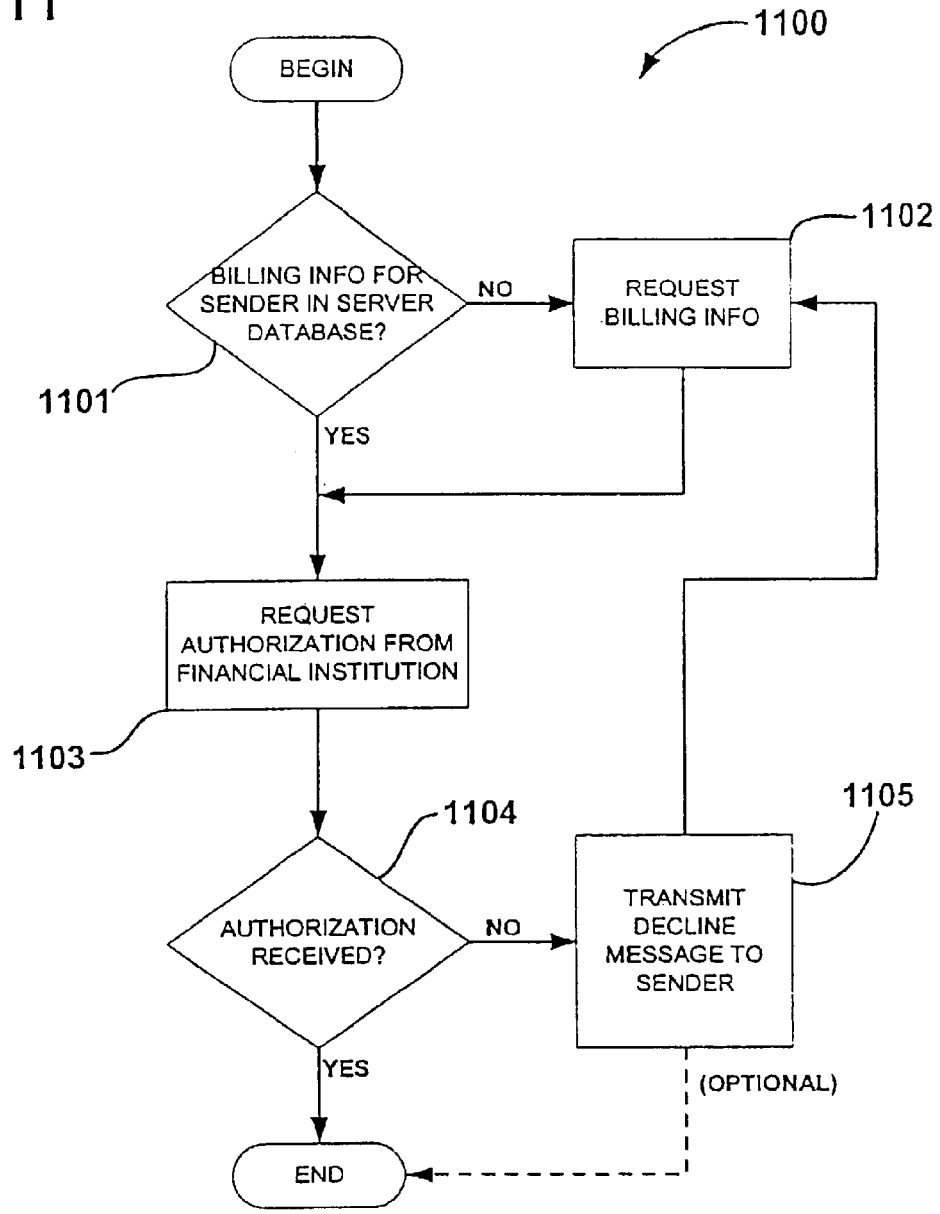
FIG. 11 is a flow diagram illustrating the process billing information routine of FIG. 7 in accordance with an embodiment of the present invention.

Referring now to FIG. 11, the process billing information routine 1100 is illustrated. In step 1101, the system checks its database to see if the sender has previously submitted billing information, such as through a registration process. If the system does not have any billing information, such as credit card, debit card, or checking account information, the system requests such information in step 1102. Since the inputting of billing information over the Internet is conventional and can be accomplished by data entry web pages, such as those shown in FIGS. 5 and 6, the specific processes are not described in detail herein. Once the system has billing information for the sender, the system sends a request for billing authorization to the financial institution of the sender in step 1103. If billing authorization is not received after a predetermined period of time or if authorization is declined by the financial institution in step 1104, the system transmits a message to the sender in step 1105 explaining the response received from the financial institution. FIG. 11 shows the system returning to step 1102 to receive alternate billing information, such as a different credit card, etc; however, the system could also be set up to end the entire process if payment authorization is not received. In any case, once payment authorization is received in step 1104, the system proceeds to the print and mail gift-gram routine 1200.

Figure 12:
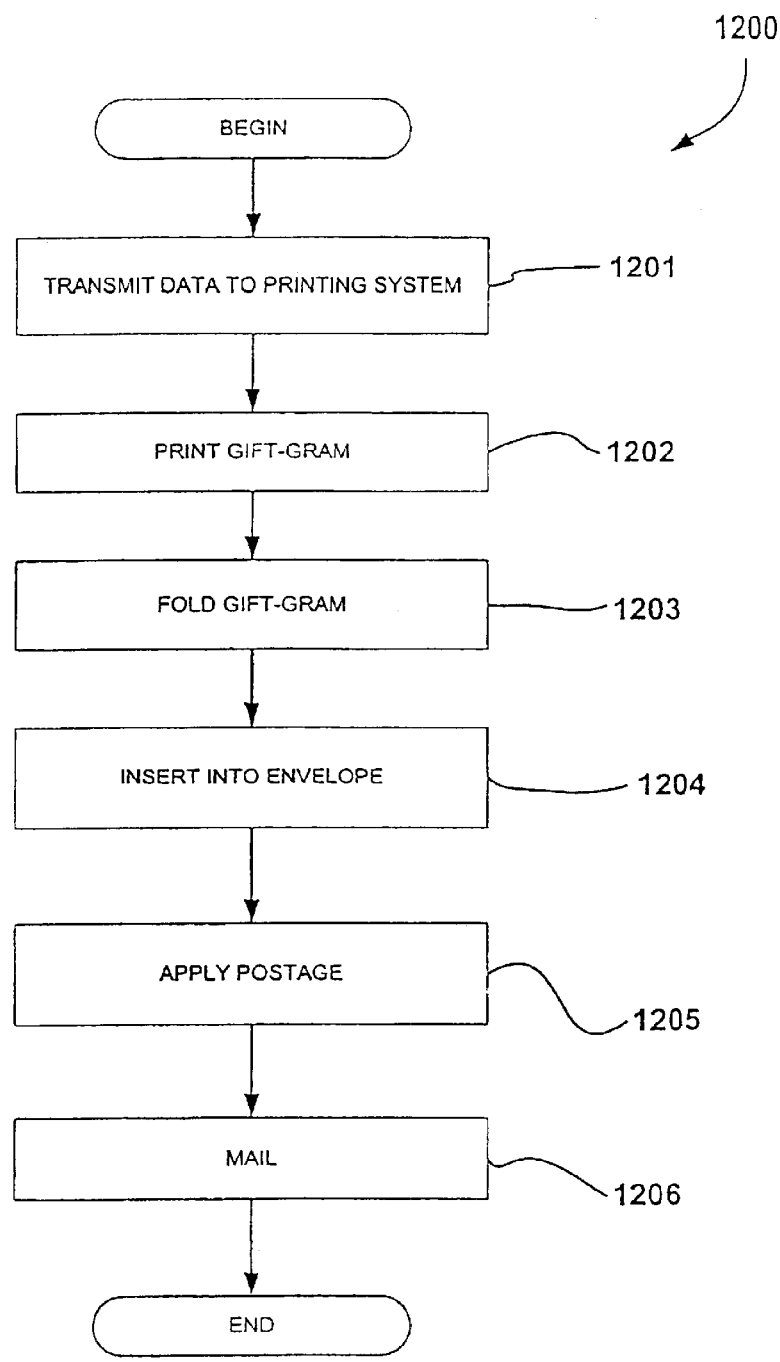
FIG. 12 is a flow diagram illustrating the print and mail routine of FIG. 7 in accordance with an embodiment of the present invention.

Turning now to FIG. 12, the basic steps of the print and mail gift-gram routine are illustrated. In step 1201, the system transmits to the printing system all of the data and formatting necessary to print the gift-gram. In step 1202, the printing system prints the gift-gram. In step 1203, the gift-gram is cut (if printed from a continuous roll of paper) and the gift-gram is then folded. In step 1204, the gift-gram is inserted into its envelope. Preferably, the mailing address is printed onto the gift-gram during step 1202, and in step 1204, the gift-gram is inserted into its envelope, which has a window through which the address will show. Further, the envelope may also include a "return" address window through which the message and "to" field information from data fields 102 and 104 would show. In step 1205, postage is applied to the envelope. The envelope will vary depending upon whether the gift-gram is being sent by First Class Mail or some other type of express mail delivery. In step 1206, the envelope with the gift-gram is mailed to the recipient. Mailing completes the essential steps of the present routine and overall system. Follow-up mail tracking, although potentially available, is known in the art and beyond the scope of the present invention.

Figure 13:
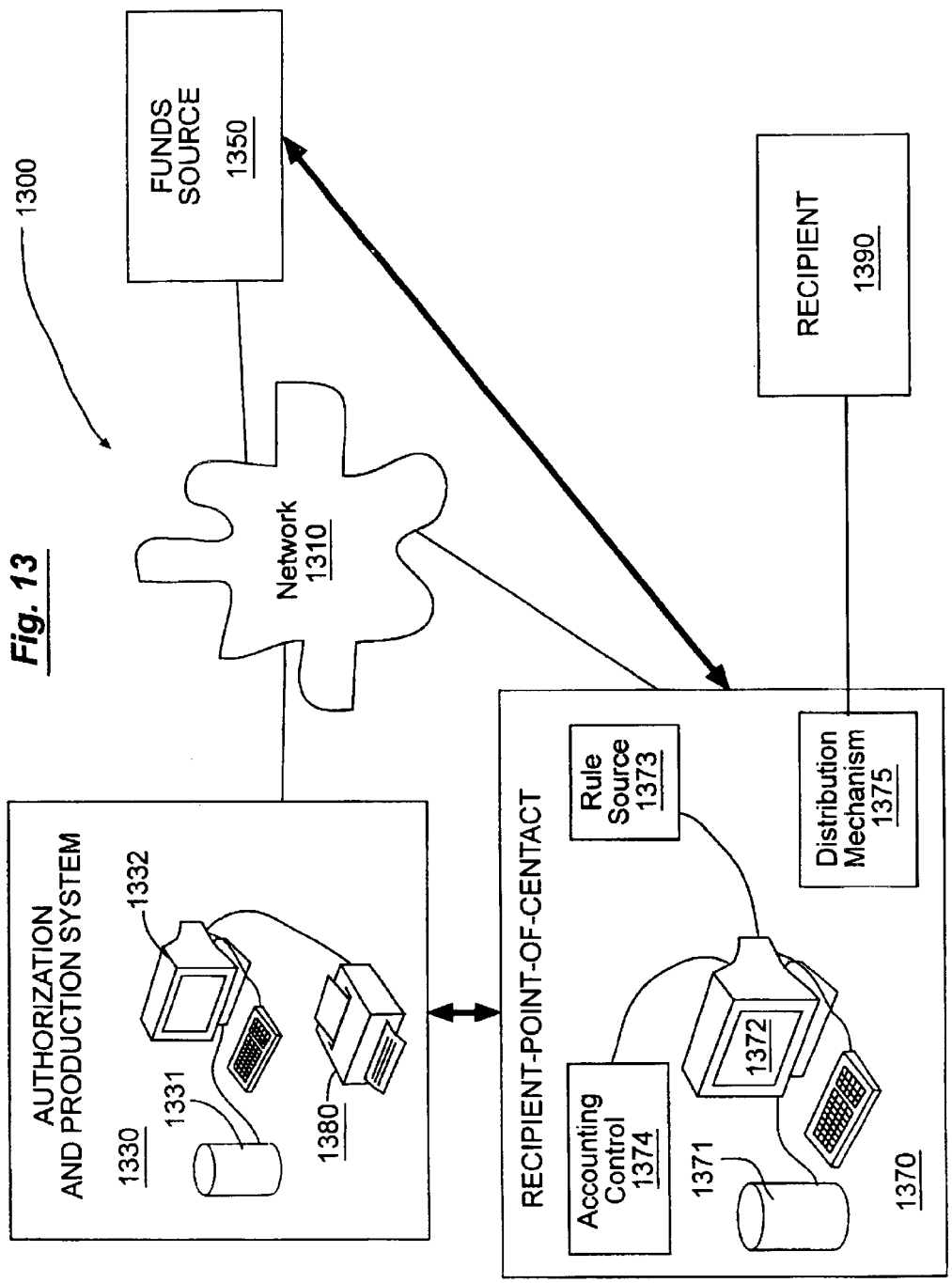
FIG. 13 illustrates a system in accordance with embodiments of the present invention for receiving requests for and preparing incentive messages.

Referring now to FIG. 13, an incentive message system 1300 in accordance with an embodiment of the present invention is illustrated. Incentive message system 1300 includes an authorization and production system 1330, a recipient point-of-contact 1370, and a funds source 1350 all communicably coupled via a communication network 1310. Communication network 1310 can be any communication network capable of providing communications between the various elements of incentive message system 1300. In some embodiments, communication network 1310 is the Internet providing message based communication between any of recipient point-of-contact 1370, funds source 1350, and/or authorization and production system 1330. In other embodiments, communication network 1310 comprises a TCP/IP compliant virtual private network (VPN). In yet other embodiments, communication network 1310 includes the Internet for communication between recipient point-of-contact 1370 and authorization system 1330, and a VPN between authorization system 1330 and funds source 1350. However, it should be recognized that other communication networks could be used to provide similar functionality. For example, communication network 1310 can be a local area network (LAN), a wide area network (WAN), a telephone network, a cellular telephone network, a virtual private network (VPN), the Internet, an optical network, a wireless network, or any other similar communication network or combination thereof.

Funds source 1350 can be any source of funds used to cover an amount indicated by the negotiable instruments of the incentive messages and/or transaction fees related to creating the incentive messages. Thus, for example, funds source 1350 can be a credit account, a credit card company, a bank, a company providing cellular minutes, frequent flyer miles and/or merchandise, or the like. Further, in some embodiments, funds source is two distinct entities where one of the entities provides funds to pay transaction fees and the other entity provides merchandise designated by the negotiable instrument provided with an incentive message. Thus, for example, creation of an incentive message may include a transaction fee of a nickel and include a negotiable instrument good for a turkey at a local supermarket chain. In such a case, funds source 1350 can include a bank associated with recipient point-of-contact 1370 to pay the transaction fee, and the local supermarket to cover the negotiable instrument, where the local supermarket enjoys a separate contractual arrangement with recipient point-of-contact 1370. Alternatively, funds source 1350 can be just the bank providing funds to cover both transaction fee and the merchandise. In such a case, authorization system 1330 can be responsible for transferring funds from the bank to the local supermarket to cover the merchandise indicated by the negotiable instrument.

As an alternative example, creation of an incentive message may include the same transaction fee, but include a money order drawn on an entity maintaining authorization system 1330. In such a case, funds source 1350 can include a bank associated with recipient point-of-contact 1370 that provides funds sufficient to cover the money order and the transaction fees. Authorization and production system 1330 transfers funds from the bank to cover both the transaction fees and the money order, and in turn authorizes printing and distribution of an incentive message including the money order. In some cases, incentive messages are not provided to recipient point-of-contact 1370 until all funds are received.

As previously suggested, authorization and production system 1330 provides a central control function of incentive message system 1300. Authorization and production system 1330 includes a database 1331, a computer 1332, and a printer 1380 or other mechanism for producing incentive messages. In some embodiments, an entity that maintains authorization facilities associated with authorization and production system 1300 maintains printer 1380, while in other embodiments, printer 1380 is maintained by a third party and used in part under the direction of an entity providing the authorization services to create incentive messages.

Database 1331 includes information about relationships with various recipient point-of-contacts 1370 and/or funds sources 1350. Computer 1332 can be any microprocessor based device capable of initiating and/or receiving communications via communication network 1310, responding to requests from recipient point-of-contact 1370, and interacting with funds source 1350. In one particular embodiment, computer 1332 is a group of computers including a network server, and a database server.

Recipient point-of-contact 1370 includes a computer 1372, a database 1371, a rule source 1373, an accounting control 1374, a distribution mechanism 1375. Database 1371 can be any database capable of maintaining information about one or more potential recipients. Thus, database 1371 can include, but is not limited to, information about employees, donors, customers, clients, or other associates of recipient point-of-contact 1370. Such information can include date of birth, employment anniversary dates, milestones such as amount of sales, performance review statistics, or any other information that can be used as the basis of providing an incentive message to the potential recipient.

Computer 1372 can be any computer capable of communicating with authorization and production system 1330 via communication network 1310, and receiving and/or accessing information related to incentive messages. In one embodiment, computer 1372 is a personal computer (PC), while in other embodiments, computer 1372 is a combination of a database server and a personal computer. It should be recognized that any computer, or combination of computers can be used in accordance with the present invention. Thus, computer 1372 can include a PC, a network server, laptop computer, a network server, a personal digital assistant (PDA), any combination thereof, or the like.

Accounting control 1374 includes systems responsible for accounting for the various transaction fees and costs of negotiable instruments associated with incentive messages that are created. Further, in some cases, accounting control 1374 is responsible for transferring funds to funds source 1530 to cover creation of incentive messages. As such, accounting control 1374 can include a computer and software running thereon to provide such functionality. Alternatively, accounting control 1374 can include software running on computer 1372. Rule source 1373 includes systems responsible for defining and/or executing rules that govern the creation and distribution of incentive messages. In one embodiment, rule source 1373 is a computer and a database of parameters that, for example, initiate the creation of an incentive message for all employees of recipient point-of-contact 1370 that have achieved a set performance criteria. In some cases, the requesting of incentive messages is performed automatically under the control of rule source 1373. In other embodiments, rule source 1373 merely provides an indication of incentive messages that could possibly be created, and a person using computer 1372 actually requests creation of one or more of the indicated incentive messages. In particular embodiments, rule source 1373 is implemented as part of authorization and production system 1330, while in the illustrated embodiment, it is implemented as part of recipient point-of-contact 1370.

Distribution mechanism 1375 includes systems responsible for distributing incentive messages to recipients 1390. As such, distribution mechanism 1375 can include an inter-office mail system associated with recipient point-of-contact 1370, or simply a person that finds the recipients and delivers the incentive messages. Alternatively, distribution mechanism 1375 can include an email system that informs one or more recipients that an incentive message is available for them to pick up at some central or other location. In accordance with the present invention, many other distribution systems are of course possible.

Figure 14:
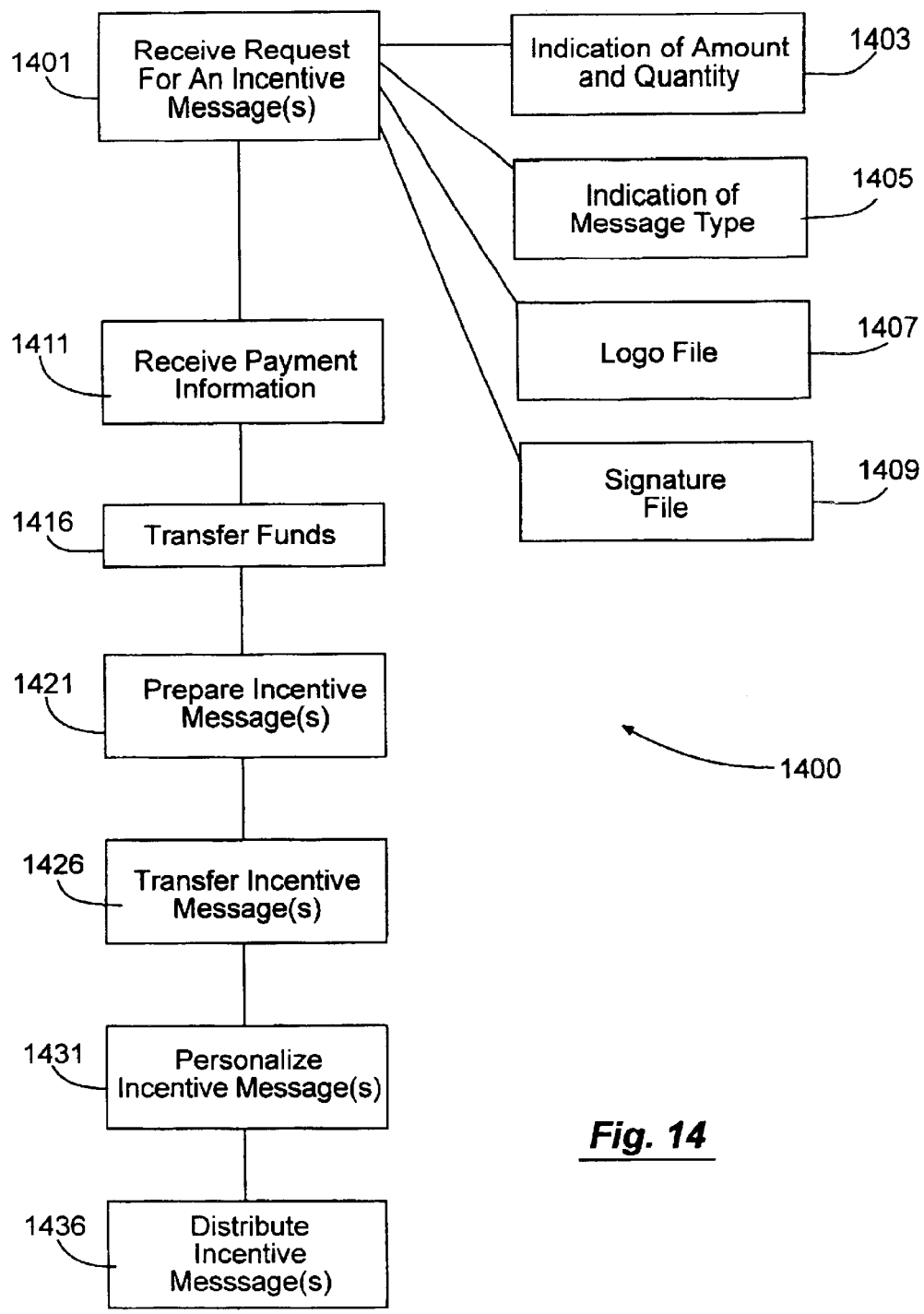
FIGS. 14–16 illustrate various flow diagram of methods for procuring incentive messages in accordance with various embodiments of the present invention.

Referring to FIG. 14, a flow diagram 1400 illustrates a method in accordance with some embodiments of the present invention for using incentive message system 1300. Following flow diagram 1400, a request for an incentive message is received (block 1401). In some embodiments, such a request is received from recipient point-of-contact 1370. The request for an incentive message can include the following: an amount of the negotiable instrument and a quantity of the incentive messages requested (block 1403), an indication of the message type (block 1405), a logo file that includes an electronic version of the logo to be printed on the incentive message (block 1407), and/or a signature file that includes an electronic version of a signature that is to be affixed to the incentive message (block 1409). Along with the information to be included with the incentive message(s) (block 1403–1409), payment information is received from the requesting party (block 1411). Such payment information can include, but is not limited to, a bank account number, a credit card number, or the like from which payment for the requested incentive message(s) can be obtained. Upon receiving the payment information, authorization and production system 1330 transfers funds from a funds source 1350 designated by the payment information (block 1416).

In addition, the requested incentive message(s) are prepared in accordance with the information provided by the requesting recipient point-of-contact (block 1421). In some cases, no preparation is performed prior to transferring the funds. In other cases, all preparation is performed and the incentive message(s) provided to the requesting recipient point-of-contact prior to transferring the funds. Such incentive message(s) can be prepared by providing a proof of the incentive message(s) to an outside printing vendor and having the messages printed in bulk. This approach is particularly applicable where limited values for the negotiable instruments are available, and limited messages are available. Further, such an approach is advantageous where no logo or signature files are to be included. In other cases, preparation of the incentive message(s) can be done using a printer maintained by authorization and production system 1330. Such an approach is particularly applicable to situations where only a limited number of incentive message(s) are to be created, and where the incentive message(s) are to be highly customized to meet the requirements of a recipient point-of-contact. Thus, in cases where logos, signatures, and other such customizations are to be included, it can be advantageous to print only limited numbers using a printer local to authorization and production system 1330.

The prepared incentive messages can then be transferred to the requesting recipient point-of-contact (block 1426). In some cases, the incentive messages are personalized by the recipient point-of-contact to address particular needs (block 1431). Such personalization can include adding the name of a recipient to the negotiable instrument and/or the message line of an incentive message. The personalized incentive messages can then be distributed to the intended recipients (block 1436).

Figure 15:
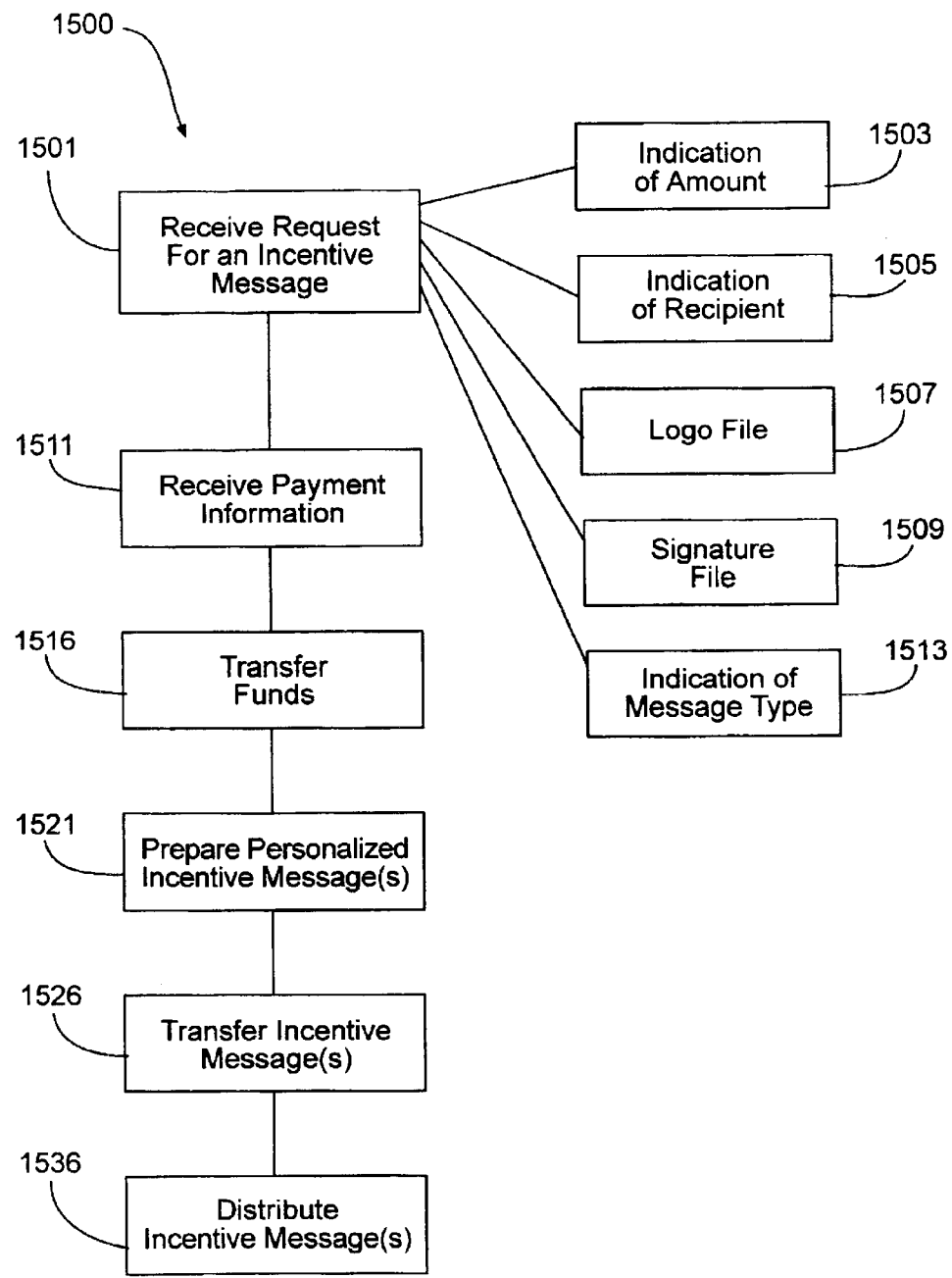

Referring to FIG. 15, a flow diagram 1500 illustrates a method in accordance with other embodiments of the present invention for using incentive message system 1300. Following flow diagram 1500, a request for an incentive message is received (block 1501). In some embodiments, such a request is received from recipient point-of-contact 1370. The request for an incentive message can include the following: an amount of the negotiable instrument (block 1503), an indication of the recipient of the incentive message (block 1505), a logo file that includes an electronic version of the logo to be printed on the incentive message (block 1507), a signature file that includes an electronic version of a signature that is to be affixed to the incentive message (block 1509), and/or an indication of the message type (block 1513). Along with the information to be included with the incentive message(s) (blocks 1503–1513), payment information is received from the requesting party (block 1511). Such payment information can include, but is not limited to, a bank account number, a credit card number, or the like from which payment for the requested incentive message(s) can be obtained. Upon receiving the payment information, authorization and production system 1330 transfers funds from a funds source 1350 designated by the payment information (block 1516).

In addition, the requested incentive message(s) are prepared in accordance with the information provided by the requesting recipient point-of-contact (block 1521). In some cases, no preparation is performed prior to transferring the funds. In other cases, all preparation is performed and the incentive message(s) provided to the requesting recipient point-of-contact prior to transferring the funds. Such incentive message(s) can be prepared by providing a proof of the incentive message(s) to an outside printing vendor and having the messages printed in bulk. This approach is particularly applicable where limited values for the negotiable instruments are available, and limited messages are available. Further, such an approach is advantageous where no logo or signature files are to be included. In other cases, preparation of the incentive message(s) can be done using a printer maintained by authorization and production system 1330. Such an approach is particularly applicable to situations where only a limited number of incentive message(s) are to be created, and where the incentive message(s) are to be highly customized to meet the requirements of a recipient point-of-contact. Thus, in cases where logos, signatures, and other such customizations are to be included, it can be advantageous to print only limited numbers using a printer local to authorization and production system 1330.

The prepared incentive messages can then be transferred to the requesting recipient point-of-contact (block 1526). In some cases, the prepared incentive messages are transferred directly to the various recipients indicated by the requesting recipient point-of-contact (blocks 1526–1536). In other cases, the prepared incentive message(s) are transferred to the requesting recipient point-of-contact, which in turn distributes the incentive message(s) to the designated recipients.

Figure 16:
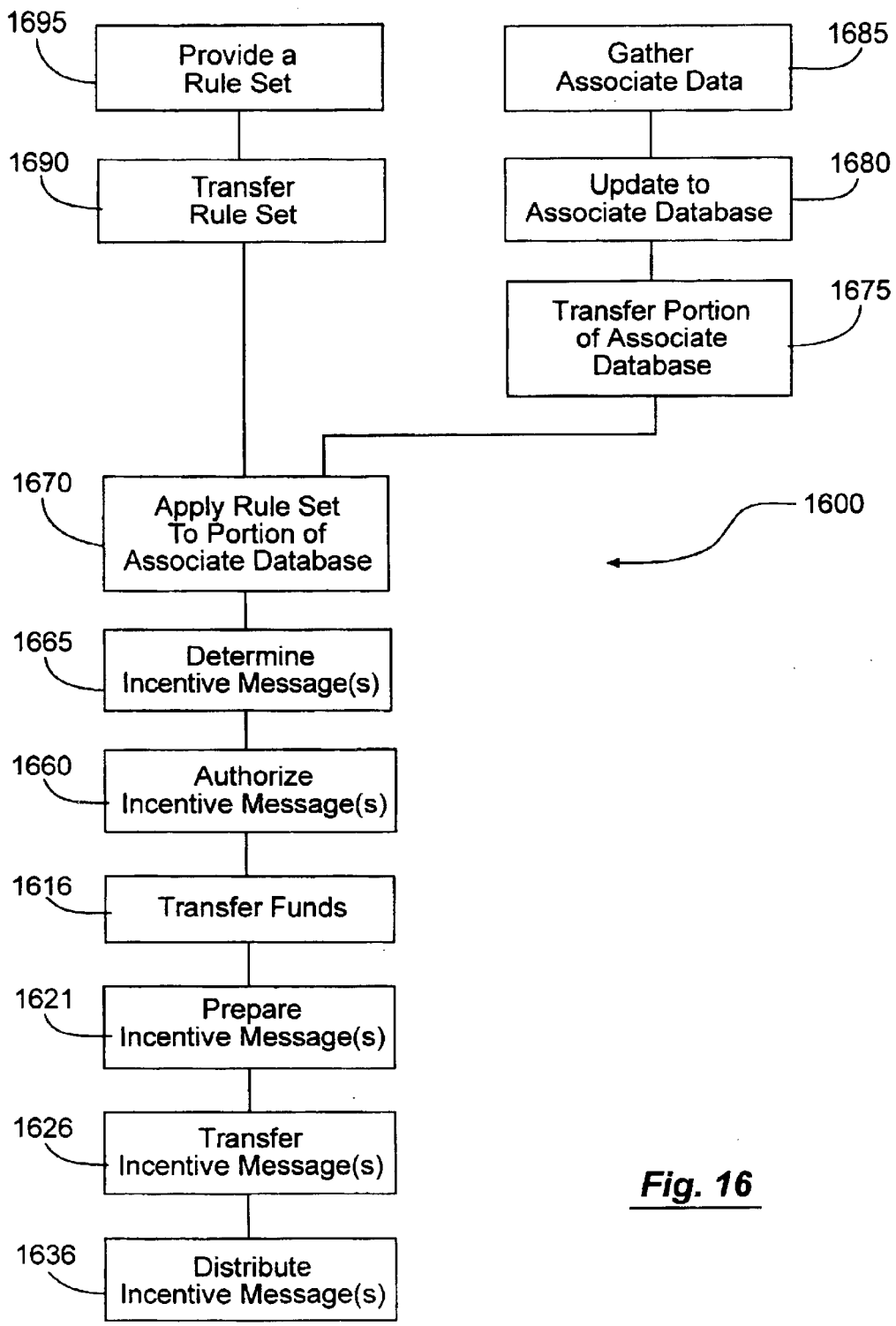

Referring to FIG. 16, a flow diagram 1600 illustrates a method in accordance with one embodiment of the present invention for using incentive message system 1300 to automatically request incentive messages. Following flow diagram 1600, a rule set governing the creation and distribution of incentive messages is provided (block 1695). Providing the rule set can include defining the rules, and in some cases, formatting the rule set into a computer program whereby the rules can be automatically applied to information associated with one or more potential recipients to determine which, if any of the potential recipients will be provided with an incentive message. Many examples of rule sets are possible in accordance with the present invention.

For example, a rule set may indicate that all customers of recipient point-of-contact 1370 that purchased more than a set amount of goods or services will be provided with an incentive message of a particular value and with a particular message. As another example, a rule set may indicate that all employees of recipient point-of-contact 1370 that have been employed continuously for five years will be provided with an incentive message with a value and a message appropriate to the milestone. As yet another example, a rule set may indicate that all employees of recipient point-of-contact 1370 are to be given an incentive message with a message from the employees manager and a negotiable instrument in an amount commensurate with a performance review of the employee provided by the same manager. In one particularly simple embodiment, the rule set is maintained in the mind of an executive of recipient point-of-contact 1370, and represents a biased opinion of about which recipients the executive desires to provide an incentive message. Based on this, one of ordinary skill in the art will recognize the many different rules and combinations of rules that can be implemented in accordance with the present invention.

Further, such a rule set can include an indication of the type of negotiable instrument to be provided, an amount of the negotiable instrument, and a message to be printed along with the negotiable instrument. In one particular embodiment where only money orders are provided, the request includes an amount of the money order, and the message to be printed with the money order.

After its creation, the rules set can be transferred to authorization and production system 1330 (block, 1690). This rule set can then be used by authorization and production system 1330 to automatically request the production and delivery of incentive messages. As further discussed below, this automatic request can be based on information about recipients 1390 associated with recipient point-of-contact 1370.

Information about the potential recipients is gathered (block 1685), stored to database 1371 (block 1680), and at least a portion of the information is transferred to authorization and production system 1330 (block 1675). Authorization and production system 1330 applies the transferred rule set to the transferred recipient information (block 1670). In some embodiments, this application is performed by computer 1332.

From application of the rule set to the information about the potential recipients (block 1670) it is determined which of the potential recipients are to receive incentive messages (block 1665). In addition, one or more messages to be associated with the incentive messages are formatted (block 1665). This formatting can include selecting a canned message appropriate to the recipient, receiving and formatting a custom message, formatting a portion of a recipient's performance review for inclusion with an incentive message, and the like. As previously mentioned, the message can be any textual and/or graphical message that is to be associated with a negotiable instrument.

Next, the incentive messages determined by applying the rule set to the provided recipient information are authorized (block 1660). Such authorization can include contacting a representative of recipient point-of-contact 1370, indicating the amount of incentive messages to be provided, and requesting a verbal authorization. Alternatively, the authorization may be implicit in the rule set and/or recipient information transferred from the recipient point-of-contact. A number of other more sophisticated authorization regimes may also be employed. For example, a previous address may be set up by recipient point-of-contact 1370 to which all incentive messages are to be delivered. Additionally, authorization for incentive messages may be limited to various representatives of recipient point-of-contact 1370, and each of the representatives may be limited to authorizing only a set amount. Yet further, authorization may require that both a representative of recipient point-of-contact 1370 be contacted, as well as that representatives supervisor.

In some embodiments, as part of sending authorizing the incentive messages, a representative of recipient point-ofcontact 1370 is authenticated. This can include requesting and verifying a representative's password and login name, or in other cases authentication can include a handshake of security codes between computer 1372 and authorization and production system 1330 to avoid any potential fraud. Such authorization can be performed via communication network 1310 and use passwords and user identifications where applicable. Yet further, authorization can include querying funds source 1350 to assure sufficient funds exist to cover the negotiable instruments and/or any costs associated with producing the incentive messages.

In other embodiments, authorization further includes requesting the funds to cover the money orders from funds source 1350 (block 1616). In yet other embodiments, authorization is not granted until the funds are actually received from funds source 1350 by an entity maintaining authorization system 1330. In other instances where the incentive messages include negotiable instruments drawn on a third party, such as a bank or source of merchandise, authorization can include obtaining permission to issue such negotiable instruments on behalf of the third party. For example, in embodiments where the negotiable instrument is a certificate for frequent flyer miles, authorization and production system 1330 can contact the airline redeeming the frequent flyer miles and request permission. Where recipient point-of-contact has a relationship with the airline to pay for any provided miles, the airline may grant the necessary permission and provide a confirmation code to authorization and production system 1330. Based on this confirmation code, authorization system 1330 proceeds to authorize the incentive message request. Based on the disclosure provided herein, one of ordinary skill in the art will recognize numerous other security features that can be implemented to assure that any incentive messages are properly authorized.

With the incentive message request authorized, authorization and production system 1330 proceeds to prepare the incentive messages in accordance with the request (block 1621). Such preparation can include selecting an appropriate message and/or graphical display to form the trophy of the incentive message, selecting the proper amount for the negotiable instrument, selecting a customized message to be included with the trophy, selecting a logo and signature for inclusion on the trophy, selecting a recipient for the incentive message, and the like. Such a process further includes assembling all of the selected elements into a single incentive message which is then printed. Such printing can be done local to authorization and production system 1330, or by a third party contracted by an entity maintaining authorization and production system 1330.

The incentive messages are then physically transferred to the requesting recipient point-of-contact (block 1626). Upon receiving the incentive messages, recipient point-of-contact 1370 can then distribute the incentive messages to recipients 1390 (block 1636).

Figure 17:
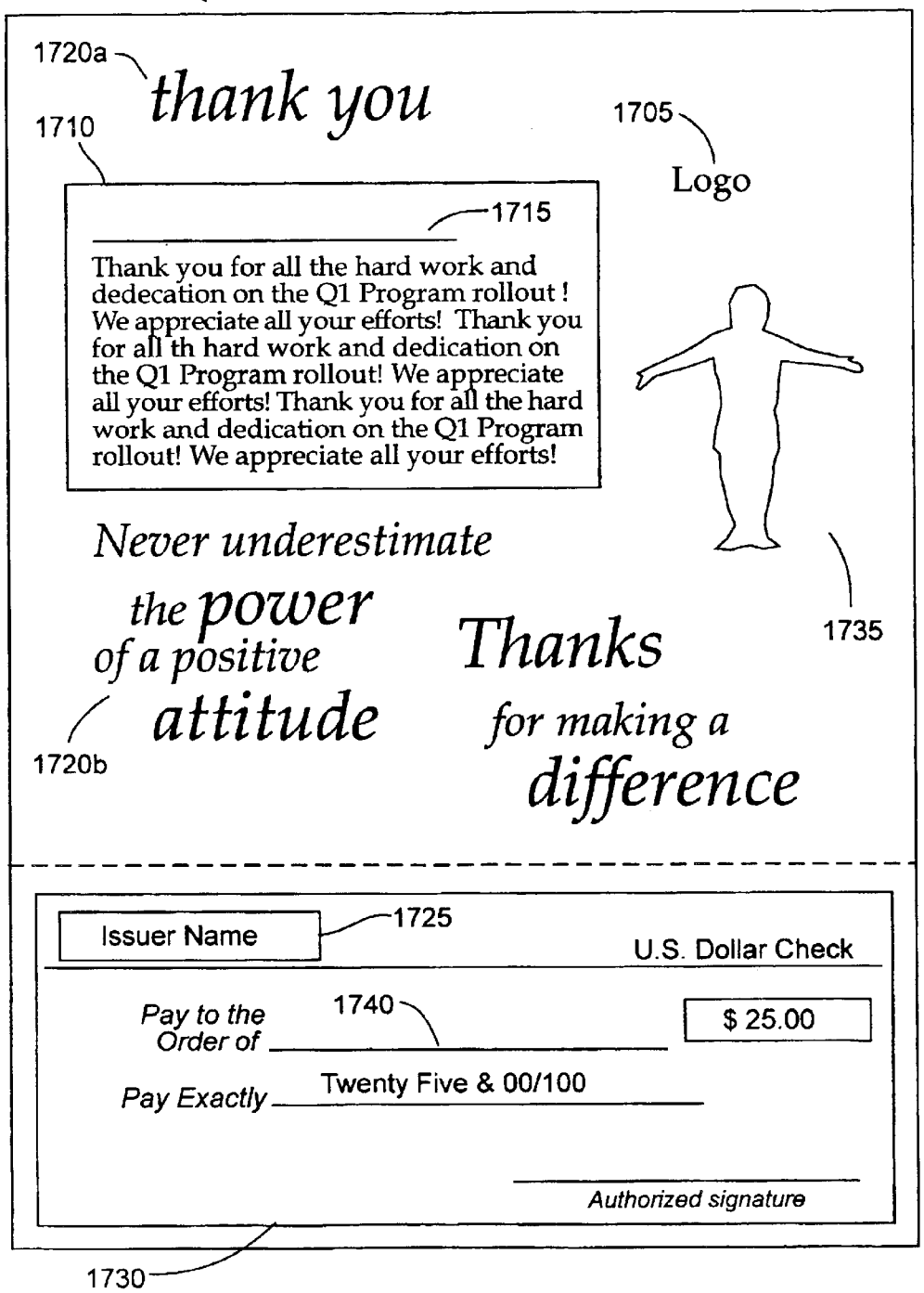
FIGS. 17–19 illustrate exemplary incentive messages in accordance with the present invention.

Referring to FIG. 17, an exemplary incentive message 1700 in accordance with an embodiment of the present invention is illustrated. Incentive message 1700 includes a trophy 1735 and a negotiable instrument 1730. Trophy 1735 includes a logo field 1705, a general message field 1720, a specific message field 1710, and a personalization field 1715. Negotiable instrument 1730 includes a payment source 1725, and a personalization field 1740.

In some cases, an outside printer pre-prepares incentive message 1700 to include general message 1720 as part of trophy 1735, and negotiable instrument 1730 indicating payment source 1725. Further, incentive message 1700 can be prepared by an outside printer in one or more pre-defined denominations. Thus, incentive message 1700 can be ordered in bulk by a recipient point-of-contact, or personalized and ordered in more limited quantities.

As one example, a requesting recipient point-of-contact provides specific message 1710 and logo 1705 for inclusion on the pre-prepared incentive message 1700. Further, the requesting recipient point-of-contact adds a recipient name on both personalization fields 1715, 1740. Based on the disclosure provided herein, however, one of ordinary skill in the art will recognize many other segregations in responsibility for producing incentive message 1700 between recipient point-of-contact, authorization and production system, and an outside printer. Further, one of ordinary skill in the art will recognize many other types of information that can be included with incentive message 1700 in accordance with the present invention. For example, various message types are discussed in U.S. patent application Ser. No. 10/163,188, entitled "Intra-Organization Negotiable Instrument Production And Messaging", and filed on Jun. 4, 2002. The entirety of such application being incorporated herein by reference for all purposes.

Figure 18:
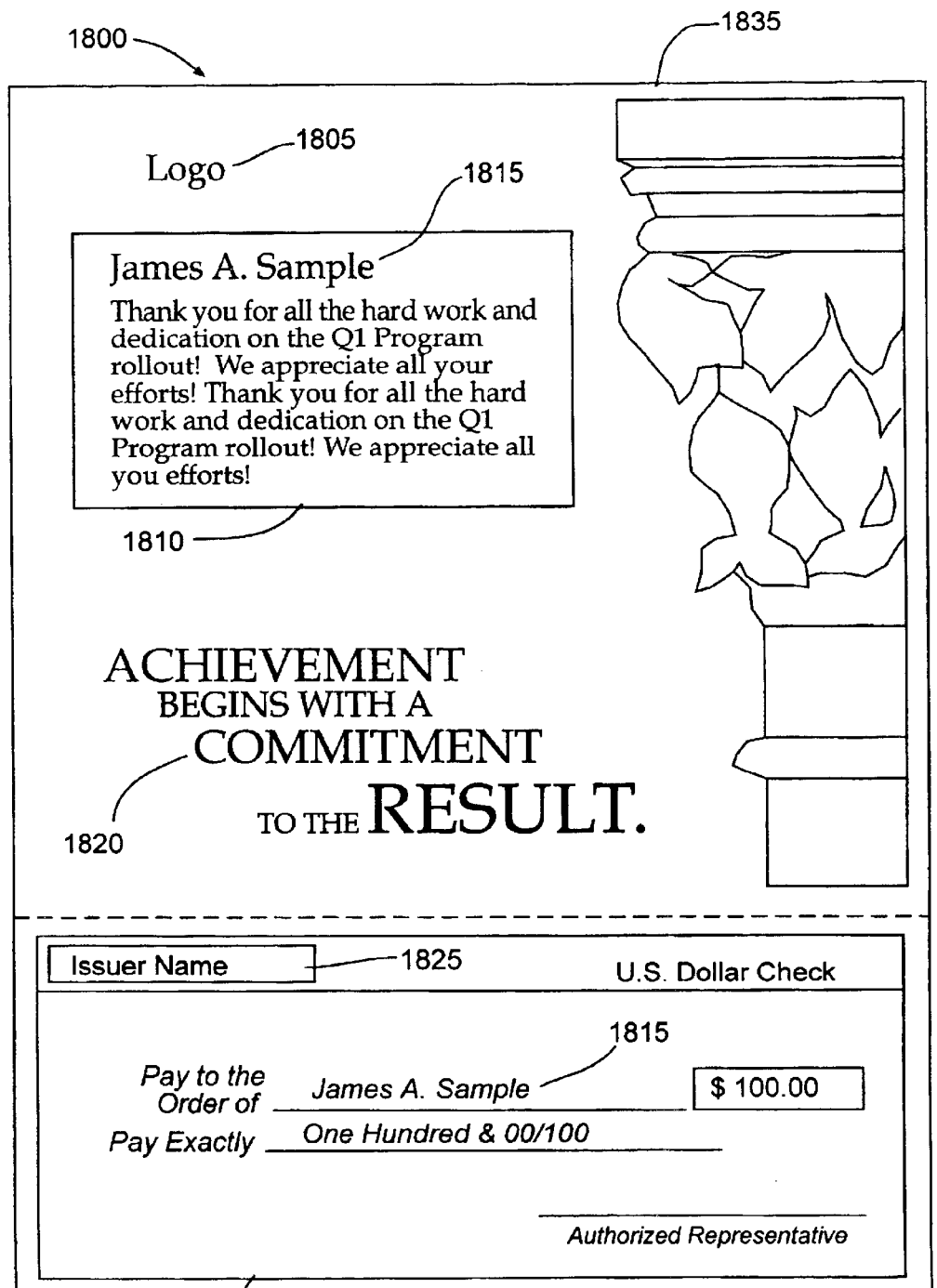

Referring to FIG. 18, another exemplary incentive message 1800 in accordance with some embodiments of the present invention is illustrated. Incentive message 1800 includes a trophy 1835 and a negotiable instrument 1830. Trophy 1835 includes a logo field 1805, a general message field 1820, a specific message field 1810, and a recipient designator 1815. Negotiable instrument 1830 includes a payment source 1825, and a recipient designator 1815.

In some cases, an outside printer pre-prepares incentive message 1800 to include general message 1820 as part of trophy 1835, and negotiable instrument 1830 indicating payment source 1825. Further, incentive message 1800 can be prepared by an outside printer in one or more pre-defined denominations. Thus, incentive message 1800 can be ordered in bulk by a recipient point-of-contact, or personalized and ordered in more limited quantities. As one example, a requesting recipient point-of-contact provides specific message 1810, logo 1805, and recipient designator 1815 for inclusion on the pre-prepared incentive message 1800.

Figure 19:
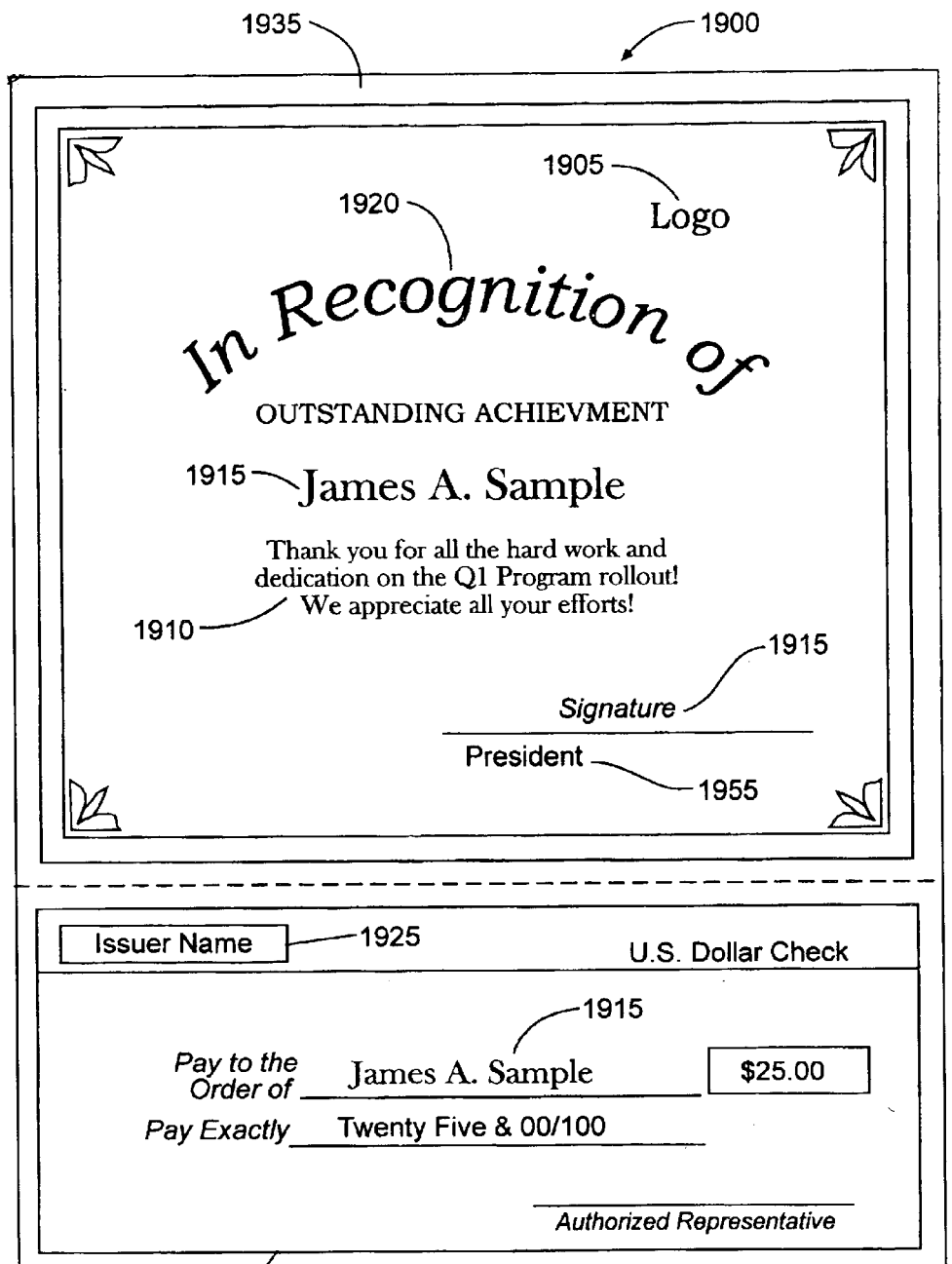

Referring to FIG. 19, yet another exemplary incentive message 1900 in accordance with other embodiments of the present invention is illustrated. Incentive message 1900 includes a trophy 1935 and a negotiable instrument 1930. Trophy 1935 includes a logo field 1905, a general message field 1920, a specific message field 1910, a recipient designator 1915, and a signature field 1950 and a signing party designator 1955. Negotiable instrument 1930 includes a payment source 1925, and a recipient designator 1915.

In some cases, an outside printer pre-prepares incentive message 1900 to include general message 1920 as part of trophy 1935, and negotiable instrument 1930 indicating payment source 1925. Further, incentive message 1900 can be prepared by an outside printer in one or more pre-defined denominations. Thus, incentive message 1800 can be ordered in bulk by a recipient point-of-contact, or personalized and ordered in more limited quantities. As one example, a requesting recipient point-of-contact provides specific message 1910, logo 1905, recipient designator 1915, and signature 1950 and signing party designator 1955 for inclusion on the pre-prepared incentive message 1900.

While some of the present invention is intended to be practiced in relation to computers, no specific software or logic circuit is intended nor is required to be used in the practicing of the present invention. Indeed, it would be a matter of routine skill to select an appropriate conventional computer system and implement the claimed process on that computer system. Accordingly, it is intended that any "means for" claims set forth herein encompass any computer embodiment of the corresponding method claims.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. For example, it will be appreciated that bulk purchases of incentive messages by a recipient point-of-contact can be effectuated in accordance with the present invention. In such bulk transfers, a general message and a defined negotiable instrument amount can be provided. The incentive message(s) can later be personalized with additional specific messages, logos, and/or recipient designators. Other cases provided incentive messages printed with a more specific message, logo, and/or associated signature. The messages can then be personalized by the recipient point-of-contact to include a recipient designator. Further, the present invention can provide incentive message(s) in any amount, with logos, signatures, specific and general messages, and/or other features.

In one particular case, a recipient point-of-contact can log into an intra-net, type in "employee recognition awards", and order incentive message(s) online. In such cases, the incentive message(s) can be fully customized, or selected from stock messages. Further, such an approach can include various controls to prevent fraud. For example, passwords and user identifications can be used to verify a requestors identity. Further, the incentive messages can be limited to delivery to a pre-defined address at the recipient point-of-contact. Yet further, a counter signature from a requestor's supervisor may be required for a purchase in excess of a particular amount. Based on the disclosure provided herein, one of ordinary skill in the art will recognize many other security features that may be employed in relation to the present invention.

Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. In a computer network, a method for distributing an incentive message, the method comprising:

providing an incentive message, wherein the incentive message includes a trophy and a negotiable instrument, and wherein the trophy is detachable from the negotiable instrument;

receiving a request for the incentive message from a recipient point-of-contact;

displaying a data entry form to the recipient point-of-contact over the computer network, wherein the form is for selecting a customized message to appear with the incentive message and for receiving a name for a recipient of the incentive message;

printing the received name on the trophy and on the negotiable instrument;

displaying a preview of the incentive message over the computer network, wherein the preview includes both the trophy and the negotiable instrument;

based at least in part on the displayed preview, receiving approval to transfer the requested incentive message to the recipient point-of-contact;

receiving a payment for the requested incentive message; and transferring the requested incentive message to the recipient point-of-contact.

2. The method of claim 1, wherein the trophy includes a custom message field for accepting the customized message, the method further comprising:

receiving the customized message from the recipient point-of-contact at the data entry form; and inserting the customized message as a personalized message in the custom message field.

3. The method of claim 2, wherein the trophy further includes a signature field for accepting a signature, the method further comprising:

receiving the signature from the recipient point-of-contact; and inserting the signature in the signature field.

4. The method of claim 1, wherein the trophy further includes a logo associated with the recipient point-of-contact.

5. The method of claim 1, wherein the request for the incentive message from the recipient point-of-contact includes an indication of an amount to be provided with the negotiable instrument.

6. The method of claim 5, wherein the amount indicates at least one of: a cash amount, and an item.

7. The method of claim 1, wherein the incentive message is a first incentive message type, the method further comprising:

providing a second incentive message type; and receiving a selection from the recipient point-of-contact, wherein the selection indicates either the first incentive message type or the second incentive message type.

8. The method of claim 1, wherein the trophy is of a size suitable for framing in frame selected from the group consisting of: an eight inch by ten inch frame, a five inch by seven inch frame, and an eleven inch by fourteen inch frame.

9. The method of claim 1, wherein the incentive message is a first incentive message type associated with a first occasion, the method further comprising:

providing a second incentive message type, wherein the second incentive message type is associated with a second occasion; and receiving a selection from the recipient point-of-contact indicating the first occasion, wherein the first incentive message is provided based at least in part on the selection of the first occasion.

10. In a computer network, a method for distributing an incentive message, the method comprising:

providing an incentive message, wherein the incentive message includes a trophy and a money order, and wherein the trophy is detachable from the money order;

receiving a request for the incentive message from a recipient point-of-contact;

displaying a data entry form to the recipient point-of-contact over the computer network, wherein the form is for selecting a customized message to appear with the incentive message and for receiving a name for a recipient of the incentive message;

printing the received name on the trophy and on the money order;

displaying a preview of the incentive message over the computer network, wherein the preview includes both the trophy and the money order;

based at least in part on the displayed preview, receiving approval to transfer the requested incentive message to the recipient point-of-contact;

receiving a payment for the requested incentive message; and transferring the requested incentive message to the recipient point-of-contact.

* * * * *

UNITED STATES PATENT AND TRADEMARK OFFICE
CERTIFICATE OF CORRECTION

PATENT NO. : 6,922,673 B2
DATED : July 26, 2005
INVENTOR(S) : Karas et al.

It is certified that error appears in the above-identified patent and that said Letters Patent is hereby corrected as shown below:

Title page,
Item [75], Inventors, delete "Denmark" and insert -- Demark --.
Item [73], Assignee, delete "Fist" and insert -- First --.

Signed and Sealed this

Fourth Day of October , 2005

JON W. DUDAS
*Director of the United States Patent and Trademark Office*